US011074925B2

(12) United States Patent
Bryan

(10) Patent No.: US 11,074,925 B2
(45) Date of Patent: Jul. 27, 2021

(54) GENERATING SYNTHETIC ACOUSTIC IMPULSE RESPONSES FROM AN ACOUSTIC IMPULSE RESPONSE

(71) Applicant: Adobe Inc., San Jose, CA (US)

(72) Inventor: Nicholas Bryan, Belmont, CA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 16/682,961

(22) Filed: Nov. 13, 2019

(65) Prior Publication Data

US 2021/0142815 A1 May 13, 2021

(51) Int. Cl.
| | |
|---|---|
| *H04B 15/00* | (2006.01) |
| *G10L 21/0364* | (2013.01) |
| *G10L 21/0232* | (2013.01) |
| *G10L 25/18* | (2013.01) |
| *G06N 20/00* | (2019.01) |
| *G10L 25/30* | (2013.01) |
| *G10L 25/51* | (2013.01) |
| *G10K 15/02* | (2006.01) |

(52) U.S. Cl.
CPC .......... *G10L 21/0364* (2013.01); *G06N 20/00* (2019.01); *G10K 15/02* (2013.01); *G10L 21/0232* (2013.01); *G10L 25/18* (2013.01); *G10L 25/30* (2013.01); *G10L 25/51* (2013.01)

(58) Field of Classification Search
CPC . G10L 21/0364; G10L 21/0232; G10L 25/18; G10L 25/30; G10L 25/51; G06N 20/00; G10K 15/02
USPC ......................................... 381/63, 94.2, 94.3
See application file for complete search history.

(56) References Cited

U.S. PATENT DOCUMENTS

| | | | | |
|---|---|---|---|---|
| 10,559,295 | B1 * | 2/2020 | Abel | G10K 15/12 |
| 2020/0404445 | A1 * | 12/2020 | Amengual Gari | H04S 7/304 |

OTHER PUBLICATIONS

M. R. Schroeder, "Natural sounding artificial reverberation," Journal of the Audio Engineering Society, vol. 10, No. 3, pp. 219-223, 1962.
"Statistical parameters of the frequency response curves of large rooms," Journal of the Audio Engineering Society, vol. 35, No. 5, pp. 299-306, 1987.
P. A. Naylor and N. D. Gaubitch, Speech Dereverberation. Springer Science & Business Media, 2010.
H. Kuttruff, Room Acoustics, 6th ed. London, U. K.: Taylor & Francis Group, 2016.

(Continued)

*Primary Examiner* — Ammar T Hamid
(74) *Attorney, Agent, or Firm* — Keller Jolley Preece

(57) ABSTRACT

The disclosure describes one or more embodiments of an impulse response system that generates accurate and realistic synthetic impulse responses. For example, given an acoustic impulse response, the impulse response system can generate one or more synthetic impulse responses that modify the direct-to-reverberant ratio (DRR) of the acoustic impulse response. As another example, the impulse response system can generate one or more synthetic impulse responses that modify the reverberation time (e.g., T60) of the acoustic impulse response. Further, utilizing the synthetic impulse responses, the impulse response system can perform a variety of functions to improve a digital audio recording or acoustic measurement or prediction model.

20 Claims, 21 Drawing Sheets

(56) References Cited

OTHER PUBLICATIONS

J.Eaton, N.D. Gaubitch, A.H. Moore, P.A. Naylor, J.Eaton, N. D. Gaubitch, A. H. Moore, P. A. Naylor, N. D. Gaubitch, J. Eaton, et al., "Estimation of room acoustic parameters: The ACE challenge," IEEE/ACM Transactions on Audio, Speech and Language Processing (TASLP), vol. 24, No. 10, pp. 1681-1693, 2016.
P.P. Parada, D. Sharma, T.vanWaterschoot, and P.A. Naylor, "Evaluating the non-intrusive room acoustics algorithm with the ace challenge," in ACE Challenge Workshop, A Satellite Event of Workshop on Applications of Signal Processing to Audio and Acoustics (WASPAA). IEEE, 2015.
T. d. M. Prego, A. A. de Lima, R. Zambrano-Lopez, and S. L. Netto, "Blind estimators for reverberation time and direct-to-reverberant energy ratio using subband speech decomposition," in Applications of Signal Processing to Audio and Acoustics (WASPAA), 2015 IEEE Workshop on. IEEE, 2015, pp. 1-5.
H. Lollmann, A. Brendel, P. Vary, and W. Kellermann, "Single-channel maximum-likelihood t60 estimation exploiting subband information," in ACE Challenge Workshop, A Satellite Event of Workshop on Applications of Signal Pro-cessing to Audio and Acoustics (WASPAA). IEEE, 2015.
F. Xiong, S. Goetze, and B. T. Meyer, "Joint estimation of reverberation time and direct-to-reverberation ratio from speech using auditory-inspired features," in ACE Challenge Work-shop, A Satellite Event of Workshop on Applications of Signal Processing to Audio and Acoustics (WASPAA). IEEE, 2015.
H. Gamper and I. J. Tashev, "Blind reverberation time estimation using a convolutional neural network," in 2018 16th International Workshop on Acoustic Signal Enhancement (IWAENC). IEEE, 2018, pp. 136-140.
B. McFee, E. J. Humphrey, and J. P. Bello, "Asoftwareframework for musical data augmentation." in ISMIR, 2015, pp. 248-254.
T. Ko, V. Peddinti, D. Povey, M. L. Seltzer, and S. Khudanpur, "A study on data augmentation of reverberant speech for robust speech recognition," in Acoustics, Speech and Signal Processing (ICASSP), 2017 IEEE International Conference on. IEEE, 2017, pp. 5220-5224.
J. Salamon and J. P. Bello, "Deep convolutional neural networks and data augmentation for environmental sound classi-fication," IEEE Signal Processing Letters, vol. 24, No. 3, pp. 279-283, 2017.
M. Karjalainen, P. Antsalo, A. Makivirta, T. Peltonen, and V. Valimaki, "Estimation of modal decay parameters from noisy response measurements," in Audio Engineering Society Convention 110. Audio Engineering Society, 2001.
N. J. Bryan and J. S. Abel, "Methods for extending room impulse responses beyond their noise floor," in Audio Engineering Society Convention 129. Audio Engineering Society, 2010.
[Part 1] P. P. Vaidyanathan, Multirate systems and filter banks. Pearson Education India, 1993.
[Part 2] P. P. Vaidyanathan, Multirate systems and filter banks. Pearson Education India, 1993.
G. J. Mysore, "Can we automatically transform speech recorded on common consumer devices in real-world environments into professional production quality speech?—a dataset, insights, and challenges," IEEE Signal Processing Letters, vol. 22, No. 8, pp. 1006-1010, 2015.
"Loudness Recommendation, European Broadcasting Union (EBU) Recommendation R128-2014," 2014.
M. Brookes et al., "VOICEBOX: Speech processing toolbox for Matlab," Software, available [Mar. 2011] from www.ee.ic.ac.uk/hp/staff/dmb/voicebox/voicebox. html, vol. 47, 1997.
"Objective Measurement of Active Speech Level, International Telecommunications Union (ITU-T) Recommendation P.56," Mar. 1993.
B. McFee, C. Raffel, D. Liang, D. P. Ellis, M. McVicar, E. Battenberg, and O. Nieto, "librosa: Audio and music signal analysis in python," in Proceedings of the 14th python in science conference, 2015, pp. 18-25.
D. P. Kingma and J. Ba, "Adam: A method for stochastic optimization," arXiv preprint arXiv:1412.6980, 2014.
F. Chollet et al.,"Keras," https://keras.io, 2015.
Y. Hioka and K. Niwa, "PSD estimation in beamspace for estimating direct-to-reverberant ratio from a reverberant speech signal," 2015.

\* cited by examiner

GENERATING SYNTHETIC ACOUSTIC IMPULSE RESPONSES FROM AN ACOUSTIC IMPULSE RESPONSE

BACKGROUND

Recent years have witnessed a rapid improvements in the field of digital audio manipulation. Indeed, advances in both hardware and software have increased the availability of capturing, consuming, modifying, and distributing digital audio recordings. In connection with these advances has come an increased focus on improving the quality of digital audio recordings. For instance, many modern computing devices provide improved hardware and software that utilize signal processing models and metrics to measure and improve the audio quality of digital audio recordings.

Despite these and other advances, many technical issues still remain with regard to conventional acoustic measurement systems, particularly in the area of capturing accurate measurements of digital audio recordings and recording environments. Indeed, many conventional systems face technical problems with respect to efficiency, accuracy, and flexibility of operation in measuring recording environments and improving digital audio recordings.

For instance, with regard to efficiency, many conventional systems utilize complex, expensive, and time-consuming testing procedures to measure acoustic properties. Specifically, many conventional systems utilize testing techniques to determine an acoustic impulse response reflecting acoustic characteristics of a particular recording environment. In order to determine an acoustic impulse response, however, conventional systems often require testing procedures that require significant time and expensive, specialized testing equipment. Many individuals and entities, however, lack the time, resources, or equipment to perform such testing.

Accordingly, many individuals or entities that create digital audio recordings do so without first testing their recording environment to determine an acoustic impulse response. As a result, in many circumstances, acoustic impulse responses are unavailable, and conventional systems are left to blindly estimate acoustic measurements from digital audio recordings themselves. These blind estimates are largely less accurate than acoustic measurements generated from specific digital audio tests. Accordingly, conventional systems that lack an acoustic impulse response are often less accurate in measuring recording environments and modifying and improving characteristics of digital audio recordings.

Furthermore, because of the time and resources required to obtain acoustic impulse responses, many conventional systems often lack adequate data for accurately training and implementing machine learning models. Indeed, because of the difficulty outlined above with regard to conventional systems, datasets for acoustic impulse responses are often small, unbalanced, and incomplete. Accordingly, many conventional systems cannot accurately generate acoustic measurement or prediction models. Moreover, the small size of these datasets limits the effectiveness of models in determining characteristics of recording environments or improving digital audio recordings.

In addition, even in circumstances where digital audio tests are implemented to determine acoustic impulse response, the results can become corrupted or damaged, requiring the need to inefficiently perform a new test. For example, the presence of unwanted noise during any part of a test often corrupts the test results (requiring application of yet another test). Each time a test is performed anew, conventional systems waste significant amounts of time and computing resources.

Moreover, conventional systems have significant shortfalls in relation to flexibility of operation. As just mentioned, many conventional systems rigidly require use of complicated software, intrusive testing procedures, or expensive testing equipment. Moreover, many conventional systems cannot flexibly modify digital audio utilizing the acoustic measurements of a recording environment. As another example, many conventional acoustic measurement systems are complex and sophisticated and thus, require training, skill, time, and experience to operate.

These, along with additional problems and issues exist in conventional systems with respect to improving the quality of digital audio recordings based on capturing measurements of digital audio recordings and recording environments.

BRIEF SUMMARY

Embodiments of the present disclosure provide benefits and/or solve one or more of the foregoing or other problems in the art with systems, non-transitory computer-readable media, and methods for improving the quality of digital audio recordings utilizing synthetic impulse responses and/or augmented impulse response datasets. For instance, the disclosed systems of the present disclosure provide multiple approaches to generate synthetic impulse responses, which can be utilized to improve existing digital audio recordings or determine acoustic measurements with improved accuracy. For example, the disclosed systems can generate synthetic impulse responses based on modifying the direct-to-reverberant ratio (DRR) of the acoustic impulse response (e.g., modify the DRR as a function of frequency). In particular, the disclosed systems can generate synthetic impulse responses with target DRRs by applying a scalar gain to an early response signal utilizing a windowed approach. As another example, the disclosed systems can generate synthetic impulse responses based on modifying the reverberation time (e.g., T-60) of the acoustic impulse response (e.g., modify the T-60 as a function of frequency). In particular, the disclosed systems can remove a noise floor of a late-field response and modify the decay rate to match a target decay rate. Utilizing one or more of these synthetic impulse responses, the disclosed systems can perform a variety of functions to improve a digital audio recording and/or prediction model.

The following description sets forth additional features and advantages of one or more embodiments of the disclosed systems, computer media, and methods.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
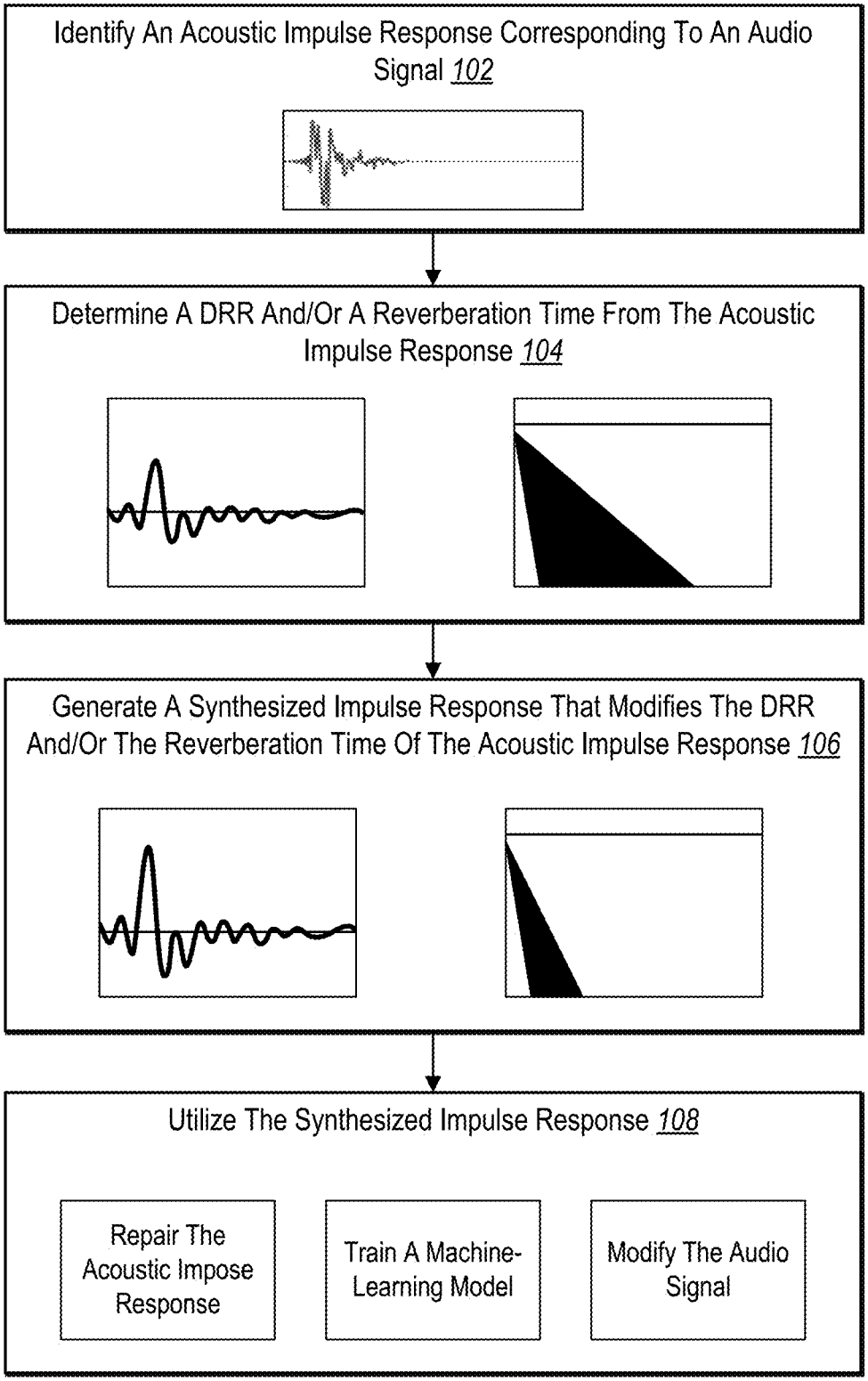
FIG. 1 illustrates an overview diagram of generating synthetic impulse responses in accordance with one or more embodiments.

This disclosure describes one or more embodiments of an impulse response system that generates accurate and realistic synthetic impulse responses. In particular, the impulse response system can parametrically control reverberation time and/or direct-to-reverberant ratio (DRR) as a function of frequency to generate synthetic impulse responses. For example, given an acoustic impulse response, the impulse response system can generate one or more synthetic impulse responses that modify the DRR by utilizing a windowed approach to applying a scalar gain to the early response signal. In addition, the impulse response system can generate one or more synthetic impulse responses that modify the reverberation time (e.g., T60) by removing a noise floor from a late-field response signal and adjusting the signal to a target decay rate. Further, utilizing the synthetic impulse responses, the impulse response system can perform a variety of functions to directly and/or indirectly improve a digital audio recording and/or signal processing.

By way of context, an acoustic impulse response (AIR) can represent the acoustic signature of a recording environment. For example, an acoustic impulse response is generally an audio signal, in the time domain (e.g., amplitude over time) of a captured impulse stimulus. Commonly, an acoustic impulse response include an early-field response portion (or simply "early response") and a late-field response portion (or simply "late response"). The early response can include a direct path arrival and early reflections imposed by the microphone-room geometry, while a late response can include information about the room volume and materials.

Direct-to-reverberant ratio (DRR) parameter and a reverberation time parameter (e.g., T60) can be used to characterize these early and late responses from recording environments. In general, a DRR parameter can indicate the energy ratio of sound arriving at a microphone directly from a source over the sound arriving after one or more surface reflections (e.g., measuring the early response). Also, the reverberation time parameter can indicate the time needed to lower the sound energy a predetermined number decibels (dBs) (e.g., 20, 30, 60 dBs) from the end of a sound source (e.g., measuring the late response).

As mentioned above, the impulse response system can generate a synthetic impulse response by modifying one or more portions of an acoustic impulse response. For instance, in various embodiments, the impulse response system generates a synthetic impulse response by modifying the early response of the acoustic impulse response. For example, the impulse response system determines a scalar based on a target DRR parameter. Then, the impulse response system can apply the scalar to the early response and smoothly transition the modified early response to the original late response to reduce discontinuity. In various embodiments, the acoustic impulse response can generate multiple synthetic impulse responses corresponding to different target DRR parameters.

Moreover, as mentioned above, the impulse response system can generate a synthetic impulse response by modifying the late response of the acoustic impulse response. For example, in some embodiments, the impulse response system changes the reverberation time of the acoustic impulse response. To illustrate, the synthetic impulse response can identify parameters estimated from an acoustic impulse response (e.g., a decay rate parameter, a noise floor parameter, and an equalization level parameter). Using the estimated parameters, the impulse response system can generate an estimated decay envelope (e.g., estimated decay curve) of the acoustic impulse response.

In various embodiments, the impulse response system utilizes the estimated decay envelope to generate a synthetic impulse response. For example, the impulse response system can extend the estimated decay envelope by removing the noise floor of the acoustic impulse response (e.g., set the noise floor parameter to zero when generating the estimated decay envelope). Then, the impulse response system can modify the extended estimated decay envelope based on a target decay rate parameter (e.g., to generate a modified estimated decay envelope).

In addition, the impulse response system can calculate a noise floor onset time from the estimated decay envelope that indicates the introductions of a noise floor. Utilizing the noise floor onset time, the impulse response system can generate a realistic synthetic impulse response by combining a synthetic audio signal generated for the modified estimated decay envelope with the audio signal associated with the acoustic impulse response.

As mentioned above, in one or more embodiments, the impulse response system modifies the early response of an acoustic impulse response. In alternative embodiments, the impulse response system modifies the late response of an acoustic impulse response. In some embodiments, the impulse response system modifies both portions of an acoustic impulse response. For example, the impulse response system first modifies the early response or an acoustic impulse response to create an initial synthetic impulse response; then, the impulse response system modifies the late response of the initial synthetic impulse response (or vice-versa) to create a synthetic impulse response.

In various embodiments, the impulse response system generates multiple synthetic impulse responses from an acoustic impulse response. For instance, given a small dataset of acoustic impulse responses, the impulse response system can generate a large number of synthetic impulse responses to augment the dataset in a balanced and realistic manner. Utilizing this augmented dataset, the impulse response system can better train a deep learning model to more accurately estimate DRR and reverberation time parameters (e.g., T60) from digital audio recordings where acoustic impulse responses are not available.

In some embodiments, the impulse response system can utilize a synthetic impulse response to repair or modify an acoustic impulse response and/or digital audio recording. For example, the impulse response system can utilize a synthetic impulse response to repair an acoustic impulse response that includes a corrupted segment or portion. As another example, the impulse response system can utilize a synthetic impulse response to change the audio properties of a digital audio recording, such as make the recording environment seem larger or smaller.

As previously mentioned, the impulse response system can provide numerous advantages, benefits, and practical applications over conventional systems. More particularly, the impulse response system can increase the quality of acoustic impulse responses, digital audio recordings, and/or acoustic analysis models. Indeed, as further described below, the impulse response system can improve computing devices with regard to efficiency, accuracy, and flexibility of operation.

For example, the impulse response system can reduce the need to perform expensive and time-consuming tests of a recording environment. Indeed, as discussed above, the impulse response system can generate synthetic impulse responses that reflect target DRRs and target decay rates. By generating synthetic impulse responses using these controlled parameters, the impulse response system can significantly reduce the time and expense of generating original acoustic impulse responses. Indeed, the impulse response system can generate balanced datasets of synthetic impulse responses across desired ranges of DRR and T60 values.

In addition to generating synthetic impulse responses that accurately reflect targeted parameters, the impulse response system can also utilize these synthetic impulse responses to more accurately train machine learning models to predict DRRs and T60s. Indeed, using synthetic impulse responses that evenly span DRR and T60 value ranges, the impulse response system can train machine learning models to more accurately predict values from input audio signals. For instance, the impulse response system can train and utilize a neural network to accurately predict DRRs and T60s directly from recorded speech (without an acoustic impulse response of the surrounding environment). The impulse response system can utilize these predicted DRRs and T60s to modify digital audio recordings (e.g., to simulate modifications to the recording environment or accurately add additional audio within a recording environment). As a result, the impulse response system can improve accuracy while also reducing the time and computing operations needed to determine DRRs and T60s and modify corresponding digital audio recordings.

As another benefit, the impulse response system can repair acoustic impulse responses that are damaged and/or corrupted during testing. For example, the impulse response system can generate a synthetic impulse response from an acoustic impulse response with a corrupted segment and utilize the synthetic impulse response to replace or repair the corrupted segment. Accordingly, the impulse response system provides increased efficiency by reducing repeated testing after errors or corrupted results.

Additionally, the impulse response system can provide improved flexibility over conventional systems. For instance, the impulse response system can measure accurate parameters (e.g., DRR and T60) directly from digital audio recordings without the need to perform complex, lengthy, and expensive tests, as described above. Indeed, the impulse response system can operate without the need for a rigid set of hardware, testing equipment, or sophisticated knowledge. Moreover, the impulse response system can utilize synthetic impulse responses in a wide range of applications. For instance, the impulse response system can utilize a synthetic impulse response to modify the acoustic characteristics of a digital audio recording (e.g., tune the reverberation sound or the room characteristics). For example, utilizing a synthetic impulse response, the impulse response system can modify a digital audio recording to sound as if it was recorded in a larger or smaller room, or to sound as if a speaker is closer or farther away from the microphone at the time of recording.

Moreover, the impulse response system can modify reverberation time and/or DRR as a function of frequency. In particular, the impulse response system can modify reverberation time for a first sub-frequency and modify DRR for a second sub-frequency. Thus, the impulse response system can flexibly modify impulse responses in full-band implementations or across specific selected sub-band frequencies.

As illustrated by the foregoing discussion, the present disclosure utilizes a variety of terms to describe features and advantages of the impulse response system. For example, as used herein, the term "audio" refers generally to captured and/or reproducible sound. For instance, audio may include sound captured in a digital audio recording. In various embodiments, audio may include speech as well as non-speech sounds regardless of the sound source (e.g., human, computer, instrument, synthetic, or natural).

The terms, "digital audio recording," "audio recording," or "audio input" may refer to electronic data that includes audio recorded over time. For example, a microphone or another type of audio capturing hardware that corresponds to a client device may capture and record audio as a digital audio recording. Also, a digital audio recording can be combined or split to form new digital audio recordings. Further, digital audio recordings can be stored and/or transmitted as audio files for playback on audio playback devices. In some embodiments, a digital audio recording is processed and/or streamed in real-time with or without storing the captured audio in an audio file.

As used herein, the term "acoustic impulse response" refers to a digital audio recording of an audio signal under test conditions. As mentioned above, an acoustic impulse response is an audio signal, generally represented in the time domain (e.g., amplitude over time) of a captured input signal (i.e., an impulse or tone such as a balloon popping). In various embodiments, an acoustic impulse response represents the acoustic signature of a recording environment. Acoustic impulse responses includes an early-field response portion (or simply "early response") and a late-field response portion (or simply "late response"). The early response can include a direct path arrival and early reflections (e.g., residual) imposed by the microphone-room geometry, while a late response can include information about the room volume and materials. Moreover, an acoustic impulse response can include multiple types of impulse responses, such as directly measured impulse responses as well as synthetic impulse responses (e.g., synthetic acoustic impulse responses).

As mentioned above, an acoustic impulse response can have an early response and a late response. In various embodiments, an acoustic impulse response can be represented as shown below in Equations 1-3.

$$h(t) = h_e(t) + h_i(t) \qquad (1)$$

$$h_e(t) = \begin{cases} h(t), & t_d - t_0 \le t \le t_d \le t_0 \\ 0, & \text{otherwise} \end{cases} \qquad (2)$$

$$h_i(t) = \begin{cases} h(t), & t < t_d - t_0 \\ h(t), & t > t_d + t_0 \\ 0, & \text{otherwise} \end{cases} \qquad (3)$$

As shown in Equations 1-3, h(t) can represent the acoustic impulse response and t can represent a discrete time index. In addition, $h_e(t)$ can represent the early response while $h_r(t)$ can represent the late response. Further, td can represent a time delay of the direct path (e.g., the time between the impulse sound being made until when the sound first reaches a microphone). Additionally, to can represent a tolerance window (e.g., set to 2.5 milliseconds). The impulse response system can identify the direct path occurring at the time that h(t) is at its highest value (e.g., the absolute value maximum).

The term "synthetic impulse response" can represent an impulse response that is been modified or revised. Indeed, a synthetic impulse response can be created from an acoustic impulse response or from another synthetic impulse response. In addition, a synthetic impulse response can include an impulse response generated by the impulse response system (e.g., not generated from an initial impulse response). Moreover, the impulse response system can modify the early response and/or the late response of an acoustic impulse response to generate a synthetic impulse response. Further, the impulse response system can augment a dataset of acoustic impulse responses by adding synthetic impulse responses to the dataset.

For ease of explanation, this disclosure will generally refer to a measured impulse response as an acoustic impulse response and a generated or modified impulse response as a synthetic impulse response. Further, the term "impulse response" refers broadly to multiple types of impulse responses, including acoustic impulse responses and synthetic impulse responses.

As used herein, the terms "decay envelope" (e.g., "two-stage energy decay envelope," "energy decay curve," or "decay curve") refer to a representation (e.g., equation) of changes in sound over time. For example, a decay envelope of an impulse response can include a curve (e.g., a best-fit curve or trend line) that reflects changes to a corresponding audio signal. As described below, the impulse response system can determine one or more decay envelopes based on measuring and modifying estimated parameters of an acoustic impulse response. Examples of decay envelopes described herein include a decay envelope, an estimated decay envelope, an extended (estimated) decay envelope, an augmented decay envelope, and a modified decay envelope.

The term "estimated impulse response parameters" (or simply "estimated parameters") refers to one or more parameters determined from an impulse response. In some embodiments, the impulse response system identifies estimated parameters utilizing a non-linear optimization function, such as the method described in "Estimation of Modal Decay Parameters from Noisy Response Measurements" by Karjalainen et al., published 2001 in the Journal of Audio Engineering Society, Vol. 50, No. 11 (hereinafter "K-T60"), which is incorporated herein by reference in its entirety. Examples of estimated parameters include, but are not limited to decay rate parameter, a noise floor parameter, and an equalization level parameter.

The term "acoustic quality metric" refers to a quantifiable measure of one or more audio characteristics in a digital audio recording (including a recording of an impulse response). For instance, the impulse response system can utilize one or more acoustic quality measurement models to analyze the audio in a digital audio recording to determine acoustic quality metrics. Examples of acoustic quality metrics include, but are not limited to a direct-to-reverberant ratio (DRR) metric and a reverberation time metric (e.g., T60) In some cases, the terms "metric" and "parameter" can be used synonymously (e.g., a DRR metric and a DRR parameter or a T60 metric and a T60 parameter).

In addition, the term "machine-learning model" refers to a computer representation that can be tuned (e.g., trained) based on inputs to approximate unknown functions. In particular, a machine-learning model can include a model that utilizes algorithms to learn from, and make predictions on, known data by analyzing the known data to learn to generate outputs that reflect patterns and attributes of the known data. The term machine-learning model can include linear regression models, logistical regression, random forest models, support vector machines (SVG) models, neural networks, or decision tree models. Thus, a machine-learning model can make high-level abstractions in data by generating data-driven predictions or decisions from the known input data.

As used herein, the term "neural network" refers to a machine learning model that includes interconnected artificial neurons that communicate and learn to approximate complex functions and generate outputs based on a plurality of inputs provided to the model. For instance, the term neural network includes an algorithm (or set of algorithms) that implements deep learning techniques that utilize a set of algorithms to model high-level abstractions in data using supervisory data to tune parameters of the neural network. Examples of neural networks include a recurrent neural network (RNN), graph neural network, generative adversarial neural network (GAN), convolutional neural network (CNN), Region-CNN (R-CNN), Faster R-CNN, Mask R-CNN, and single-shot detect (SSD) networks.

Referring now to the figures, FIG. 1 illustrates an overview diagram of generating synthetic impulse responses in accordance with one or more embodiments. In particular, FIG. 1 includes a series of acts 100 of the impulse response system generating and utilizing one or more synthetic impulse responses. As shown, the series of acts 100 includes an act 102 of the impulse response system identifying an acoustic impulse response corresponding to an audio signal.

As shown in FIG. 1, the series of acts 100 also includes an act 104 of the impulse response system determining a DRR and/or reverberation time from the acoustic impulse response. For example, as shown in connection with the act 104, the impulse response system can identify a DRR (i.e., direct-to-reverberant ratio) for the acoustic impulse response (corresponding to the graph shown on the left). As another example, the impulse response system can identify a reverberation time, such as T-60 (corresponding to the graph shown on the right). In some embodiments, the impulse response system also determines additional parameters, such as a decay rate parameter, a noise floor parameter, or an equalization level parameter.

FIG. 1 also shows that the series of acts 100 includes an act 106 of generating a synthetic impulse response that modifies the DRR and/or the reverberation time of the acoustic impulse response. For instance, the impulse response system generates a synthetic impulse response based on a target DRR. For example, the impulse response system modifies the acoustic impulse response to align with a target DRR. To illustrate, the graph shown in the left includes a synthetic impulse response with an increased DRR. Additional detail regarding generating a synthetic impulse response based on modifying the DRR is provided below in connection with FIGS. 2-4E.

In additional or alternative embodiments, the impulse response system can generate a synthetic impulse response by modifying the reverberation time. For example, the impulse response system can revise a decay rate parameter based on a target decay rate parameter (e.g., for one or more frequency sub-bands or for the entire full-band). To illustrate, the graph shown in the right includes a synthetic impulse response with a decreased reverberation time. As mentioned above, the impulse response system can generate a synthetic impulse response from the acoustic impulse response or from a previously created synthetic impulse response (e.g., an impulse response with the DRR previously modified). Additional detail regarding generating a synthetic impulse response based on modifying the estimated parameters (e.g., the decay rate parameter) is provided below in connection with FIGS. 5-7D.

As shown in FIG. 1, the series of acts 100 includes an act 108 of the impulse response system utilizing the synthetic impulse response. For example, as illustrated, the impulse response system can repair the acoustic impulse response with the synthetic impulse response. In addition, the impulse response system can train a machine-learning model (e.g., a deep learning model) utilizing the synthetic impulse response. Further, the impulse response system can modify a digital audio recording based on the synthetic impulse response. Additional detail regarding utilizing one or more synthetic impulse responses is provided below in connection with FIGS. 8-10.

Figure 2:
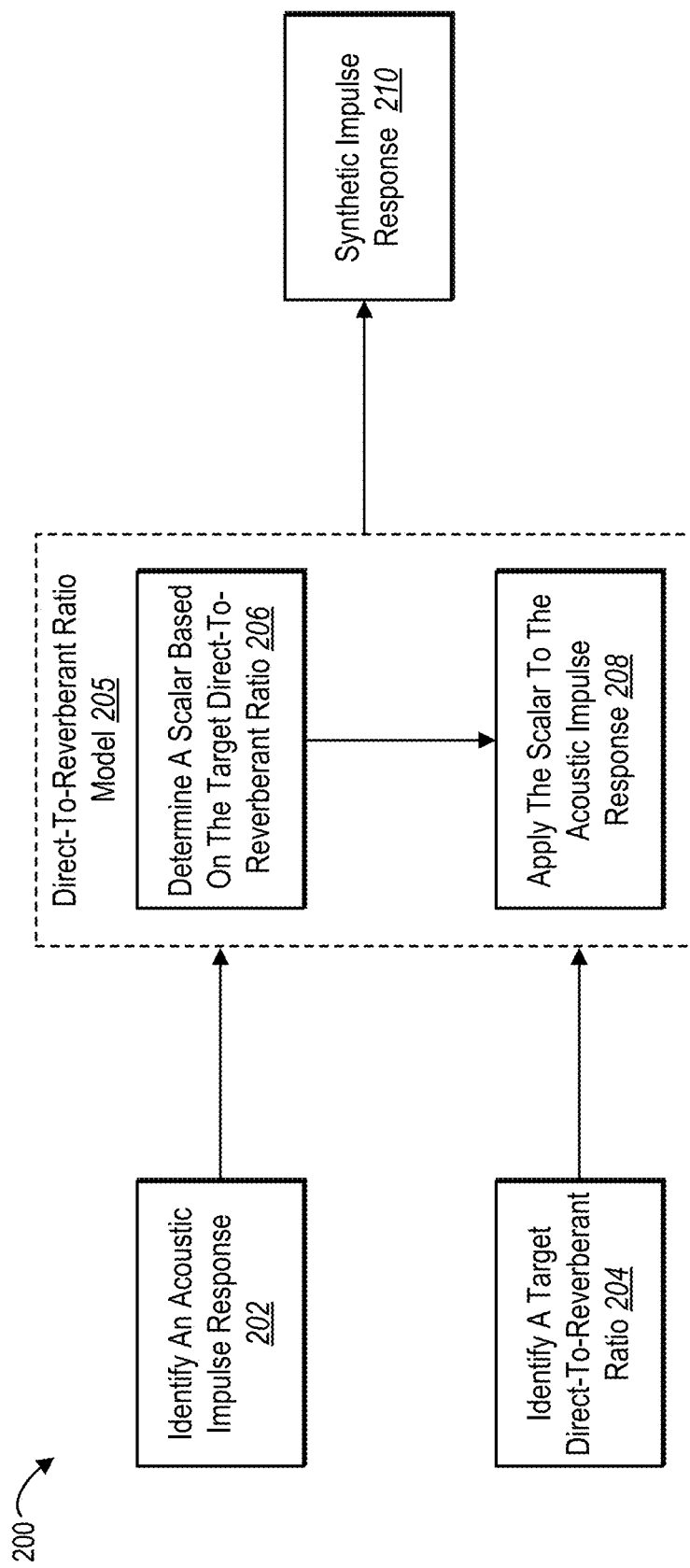
FIG. 2 illustrates an overview of generating synthetic impulse responses based on target direct-to-reverberant ratios in accordance with one or more embodiments.

As mentioned above, FIGS. 2-4E provide detail regarding generating a synthetic impulse response based on modifying the DRR. For example, FIG. 2 illustrates an overview of generating a synthetic impulse response based on a target direct-to-reverberant ratio (DRR) in accordance with one or more embodiments. More specifically, FIG. 2 includes a block diagram of a series of acts 200 of the impulse response system generating a synthetic impulse response utilizing a direct-to-reverberant ratio model 205 that modifies an acoustic impulse response based on applying a target DRR.

As shown, the series of acts 200 includes an act 202 of the impulse response system identifying an acoustic impulse response. For example, in one or more embodiments, the impulse response system is associated with a client device having one or more microphones that capture the acoustic impulse response. In some embodiments, the impulse response system loads or otherwise receives the acoustic impulse response (e.g., from another client device or from a server device). As mentioned above, in various embodiments, the acoustic impulse response can be a synthetic impulse response.

In addition, the series of acts 200 includes an act 204 of the impulse response system identifying a target direct-to-reverberant ratio (DRR). For example, the impulse response system receives a target DRR from user input that indicates a desired DRR for the acoustic impulse response. For instance, a user desires to double the DRR of an acoustic impulse response to make a digital audio recording appear as if the sound source (e.g., speaker) was located closer to a microphone at the time of recording. In other instances, a user may desire to augment a dataset by adding impulse responses having a range of DRRs.

In one or more embodiments, a target DRR can be a particular value or number. For example, the impulse response system can set the DRR of an acoustic impulse response to the target DRR. In some embodiments, the target DRR is a relative value, such as a value that doubles or halves the current DRR of an acoustic impulse response. In various embodiments, the target DRR is incremental (or decremental), such as a value that increases (or decreases) the DRR of the acoustic impulse response by a specified number of decibels.

As shown, the series of acts 200 includes an act 206 of the impulse response system determining a scalar based on the target DRR utilizing the direct-to-reverberant ratio model 205. For instance, in various embodiments, the impulse response system can calculate a scalar gain that achieves the target DRR. When multiple target DRRs are identified, the impulse response system can determine a separate scalar corresponding to each of the target DRRs.

In some embodiments, the impulse response system can determine the scalar by decomposing the early response of the acoustic impulse response into two parts or portions (e.g., a direct path and a residual) and use windows (e.g., a Hann window) to solve for the scalar. Further, utilizing the target DRR and a scalar variable with the direct path portion, the impulse response system can solve (i.e., determine) the scalar using back calculations. For example, as described below in connection with FIGS. 4A-4E, the impulse response system can solve a quadratic equation to determine the scalar.

As also shown, the series of acts 200 includes an act 208 of the impulse response system applying the scalar to the acoustic impulse response utilizing the direct-to-reverberant ratio estimation model 205. For example, in one or more embodiments, the impulse response system applies (e.g., multiplies) the target scalar to the early response of the acoustic impulse response to generate a modified early response (e.g., a synthetic early response). In additional embodiments, the impulse response system can utilize a Hann window (or other windowing approach) to smoothly cross-fade the modified early response with the original late response of the acoustic impulse response to generate a synthetic impulse response. In this manner, the impulse response system can reduce or eliminate discontinuities in the synthetic impulse response. Additional detail regarding the acoustic impulse response applying scalars is described below (e.g., in relation to FIGS. 4A-4C.

In one or more embodiments, the impulse response system can also verify that the synthetic impulse response is realistic. For example, the impulse response system compares the maximum value (e.g., absolute value) of the late response of the synthetic impulse response to the original direct path maximum value (e.g., the first portion of the early response). If the late response maximum value is greater than the original direct path maximum value, then the impulse response system clips (e.g., reduces) the allied scalar. In this manner, the impulse response system can impose an empirical lower bound on the DRR of synthetic impulse responses, which limits the DRR range. Indeed, in the case of reducing the DRR of an acoustic impulse response, the impulse response system can ensure that the early response of the synthetic impulse response is not reduced to the point where the late response has a larger amplitude.

As mentioned above, the impulse response system can generate a synthetic impulse response for an acoustic impulse response based on a target DRR. To illustrate, FIG. 2 includes the direct-to-reverberant ratio estimation model 205 outputting a synthetic impulse response 210. In various embodiments, the impulse response system can generate multiple synthetic impulse responses from the acoustic impulse response. For example, if the impulse response system identifies multiple target DRRs, the impulse response system can generate a corresponding number of synthetic impulse responses for a single acoustic impulse response.

Figures 3A, 3B, 3C:
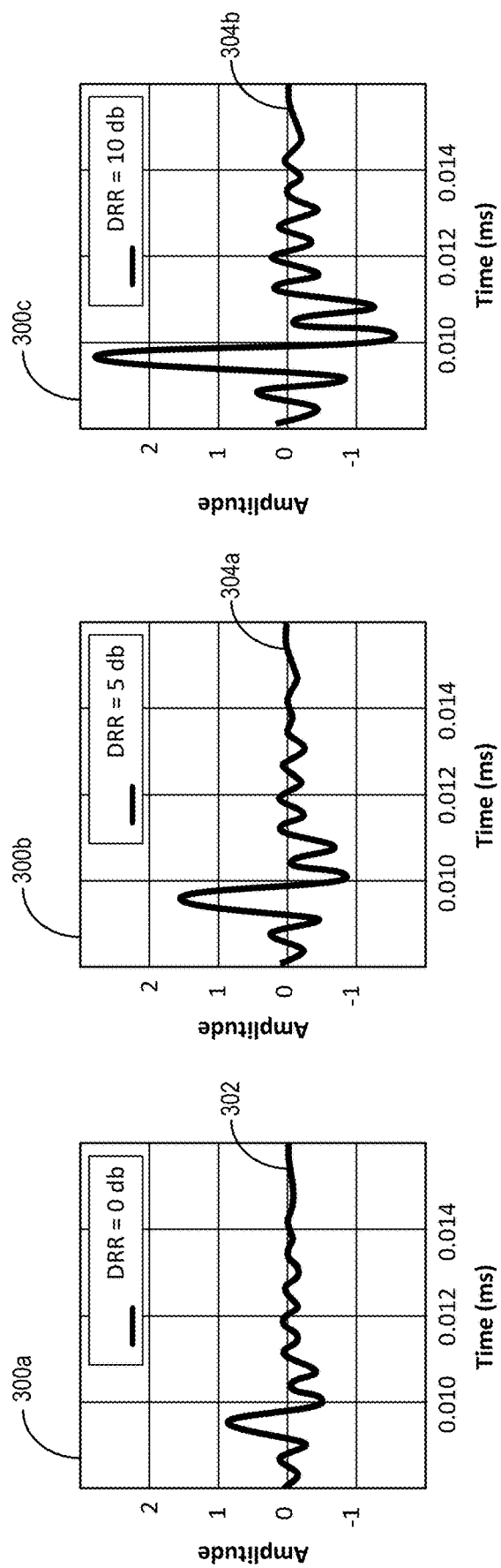
FIGS. 3A-3C illustrate examples of synthetic impulse responses in accordance with one or more embodiments.

FIGS. 3A-3C illustrate examples of synthetic impulse responses generated by the impulse response system in accordance with one or more embodiments. For instance, FIGS. 3A-3C show synthetic impulse responses generated based on various target DRRs. As shown, FIGS. 3A-3C each includes an amplitude-over-time graph 300a-300c of an impulse response (shown in dBs). In addition, each graph shows the early portion of impulse responses (e.g., within the first few milliseconds of capturing the input impulse). Further, the legend in each graph indicates the target DRR corresponding to the impulse response within the graph.

More particularly, FIG. 3A shows a first graph 300a that includes the acoustic impulse response 302. As shown, the peak amplitude of the direct path of the acoustic impulse response is near 1. FIG. 3B includes a second graph 300b that includes a first synthetic impulse response 304a where the impulse response system generates a synthetic impulse response that adds 5 dBs to the DRR of the acoustic impulse response 302. As shown, the peak amplitude of the direct path increases to above 1. In general, the amplitude of the first synthetic impulse response 304a is increased with respect to the acoustic impulse response 302 near the direct path portion (e.g., the front) of the first synthetic impulse response 304a.

FIG. 3C shows a third graph 300c that includes a second synthetic impulse response 304b where the impulse response system increases the DRR by 10 dBs. As shown, the peak amplitude of the direct path for the second synthetic impulse response 304b more than doubles. However, as shown, as the impulse response progresses in time, the scaling factor (i.e., scalar) applied to the second synthetic impulse response 304b is reduced. In this manner, the modified early response can smoothly transition into the late response of the acoustic impulse response 302, forming an overall realistic impulse response.

As mentioned above, FIGS. 4A-4E provide additional detail regarding generating a synthetic impulse response with respect to DRR. In particular, FIGS. 4A-4E illustrate generating a synthetic impulse response that matches a target DRR in accordance with one or more embodiments. As shown, FIGS. 4A-4E include a graph 400 showing amplitude (x-axis) over time (y-axis). Similar to FIGS. 3A-3C, the graph 400 includes the early response (i.e., the early-field response portion) of an impulse response.

Figure 4A:
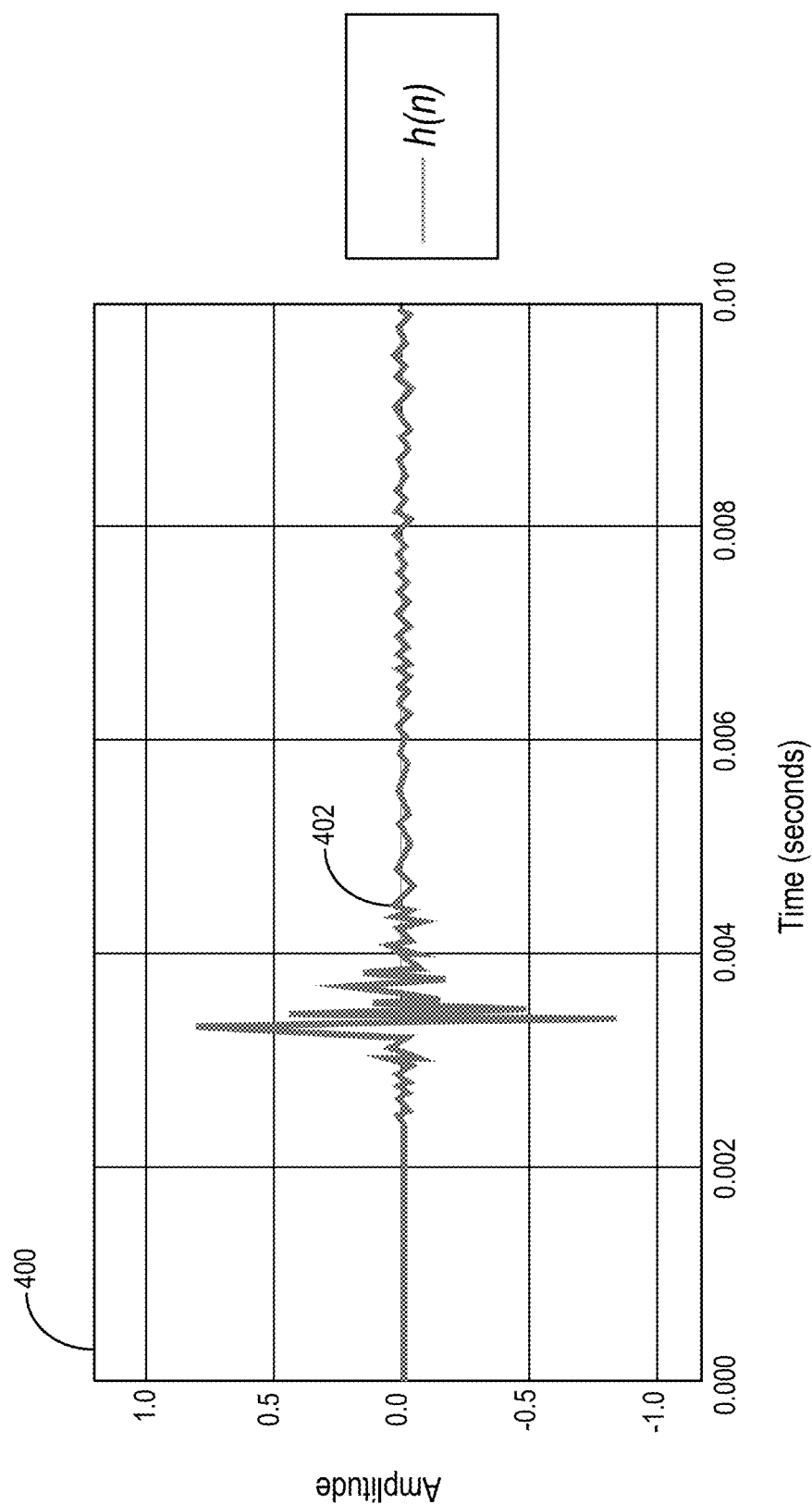
FIGS. 4A-4E illustrate generating a synthetic impulse response that matches a target direct-to-reverberant ratio in accordance with one or more embodiments.

As shown in FIG. 4A, the graph 400 includes an acoustic impulse response 402. In particular, FIG. 4A shows the early response of an acoustic impulse response 402, which corresponds to sound traveling directly from a source to a microphone (e.g., no reflected sound off walls of the recording environment). Accordingly, the acoustic impulse response 402 in FIG. 4A includes a brief delay time of silence (e.g., the flat segment of the signal on the left) before detecting and capturing an impulse sound. The first sound arriving at the microphone is called the direct path arrival of sound or simply direct path. As shown in the legend, the acoustic impulse response 402 is represented as h(n).

As mentioned above, the impulse response system can determine DRR from the acoustic impulse response 402. To illustrate, the impulse response system can determine DRR using Equation 4:

$$DRR_{dB} = 10\log_{10}\left(\frac{\sum_t h_e^2(t)}{\sum_t h_l^2(t)}\right) \quad (4)$$

As discussed earlier, $h_e(t)$ can represent the early response while $h_l(t)$ can represent a late response. Further, t can represent a discrete time index, as noted above in connection with Equations 1-3.

As mentioned above, to generate a synthetic impulse response from the acoustic impulse response 402, in one or more embodiments, the impulse response system can apply a scalar to the acoustic impulse response 402. For example, the acoustic impulse response applies the scalar a to the early response (i.e., $h_e(t)$) of the acoustic impulse response 402, as shown below in Equation 5 below.

$$h_e(t) \leftarrow h_e(t)\alpha \quad (5)$$

In various embodiments, after the impulse response system applies the scalar to the acoustic impulse response 402 to generate a synthetic impulse response, the impulse response system can utilize the DRR estimation model (e.g., Equation 4) to determine the DRR of the synthetic impulse response. In a similar manner, given a target DRR, the impulse response system can determine (e.g., back calculate) a value for the scalar that is to be applied to the acoustic impulse response 402 to arrive at the target DRR, as further described below.

In some embodiments, when applying the scalar to the acoustic impulse response 402, the impulse response system can use one or more approaches and techniques to minimize discontinuities and maintain realistic impulse responses. As mentioned above, the impulse response system can utilize a windowed approach. In this manner, the impulse response system can apply smoothing to either side of the acoustic impulse response 402 when the scaler is applied. For example, as noted above, the impulse response system decomposes the early response into a windowed direct path and a windowed residual path.

Figure 4B:
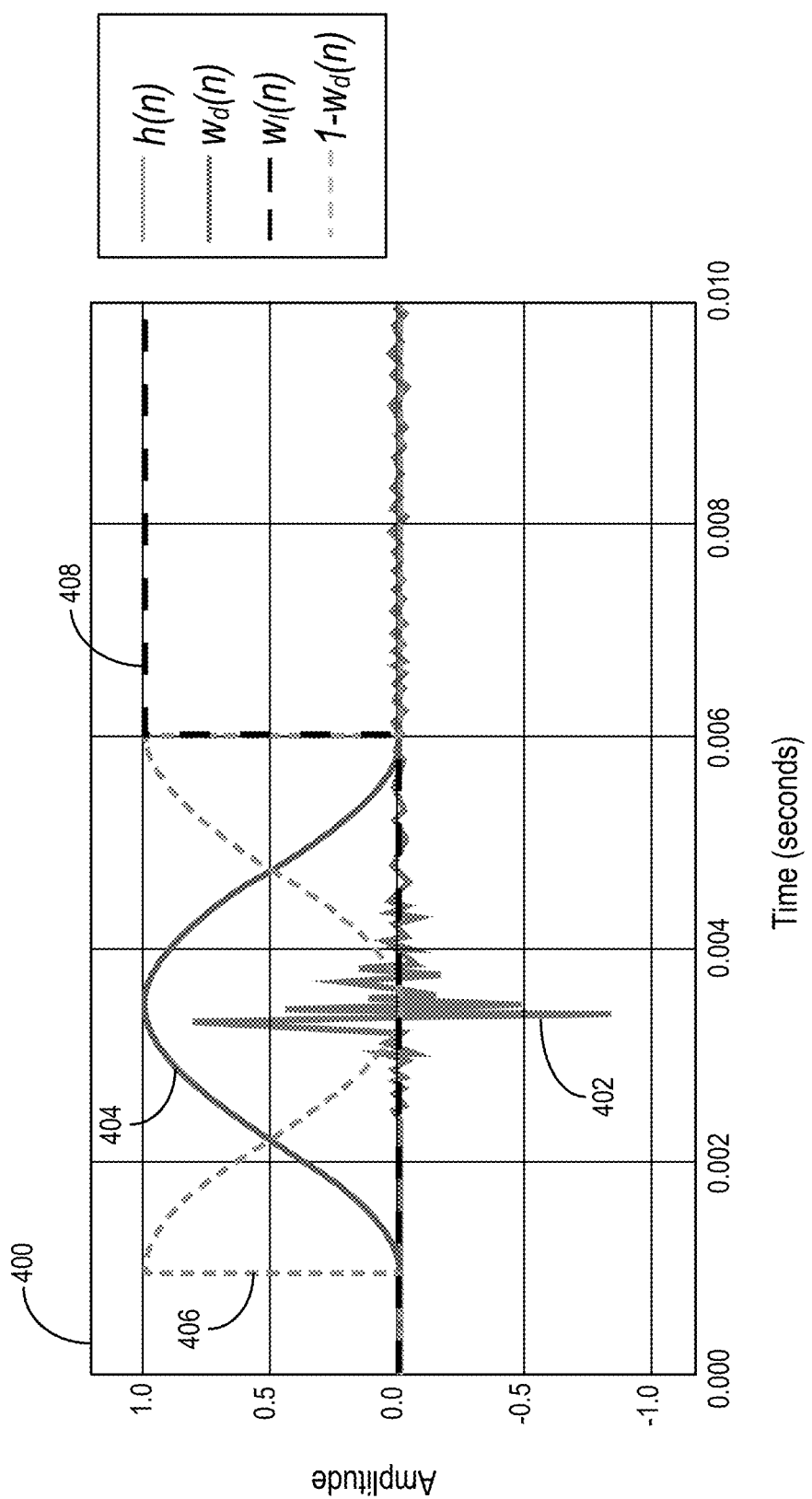

To illustrate, FIG. 4B introduces a direct path window 404 (i.e., $w_d(n)$), a residual window 406 (i.e., $1-w_d(n)$), and a late response window 408 (i.e., $w_l(n)$) to the graph 400 of the acoustic impulse response 402. As shown, the direct path window 404 is represented by a 5 millisecond Hann window function, where the value of the window changes as a function of time. While a Hann window is used, in other embodiments, the impulse response system utilizes other types of windows (i.e., window functions), such as a utilizing a boxcar window, a rectangle window, a triangle window, a cosine window, a sine window, a Hamming window, a Blackman window, a B-spline window, a flat-top window, a Tukey window, a Welch window, a Gaussian window, a hybrid window, or another type of window. In addition, the direct path window 404 can vary in duration, such as being shorter or longer in time.

As shown in FIG. 4B, the residual window 406 is an inverse of the direct path window 404. In particular, when the direct path window 404 increases, the residual window 406 decreases proportionally. In this manner, the impulse response system can smoothly transition from applying the scalar within the direct path window 404 to rejoining the late response of the acoustic impulse response 402 (indicated by the late response window 408 moving from 0 to 1 within the graph) without jumps, gaps, or other discontinuities.

To further illustrate, the impulse response system can utilize a DRR scalar windowing model to smoothly apply the scalar to the acoustic impulse response 402. For example, Equation 6 shown below provides an embodiment of a DRR scalar windowing model.

$$h_e(t) = \alpha w_d(t) h_e(t) + [1 - w_d(t)] h_e(t) \quad (6)$$

As shown, Equation 6 includes the early response (i.e., $h_e(t)$), the discrete time index (i.e., t), the scalar (i.e., $\alpha$), the direct path window 404 (i.e., $w_d(n)$), and the residual window 406 (i.e., $1-w_d(n)$). More specifically, Equation 6 includes two parts or portions. In the first portion, the impulse response system can apply (e.g., multiply) the scalar to the acoustic impulse response 402 within the direct path window 404. In the second portion, the impulse response system can utilize the value of acoustic impulse response 402 itself within the residual window 406 without the scalar applied. Further, the impulse response system can sum the first portion and second portion of Equation 6 together to get a synthetic early response (i.e., a synthetic impulse response having a synthetic early-field response portion).

Figure 4C:
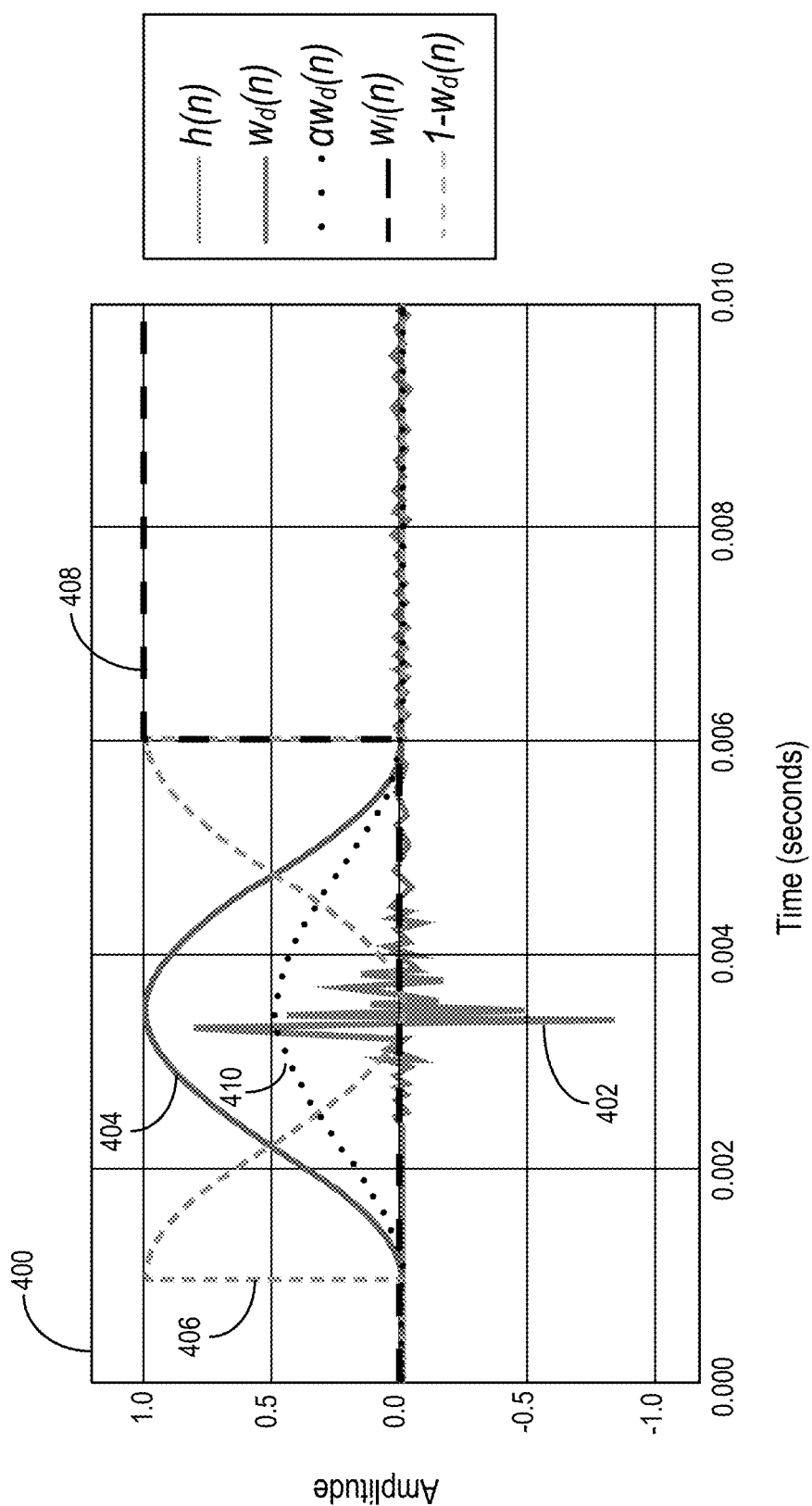

To illustrate, FIG. 4C illustrates a windowed scalar 410 within the graph 400. As shown in the graph 400, the scalar a is approximately 0.5. Accordingly, applying the scalar to the direct path window 404 reduces the size of the direct path window 404 by half, as shown by the windowed scalar 410. Indeed, the windowed scalar 410 changes over time in connection with the direct path window 404. In some embodiments, the scalar is over 1.0, which would increase the size of the windowed scalar 410 to be larger (e.g., taller) than the amplitude of the direct path window 404.

Figure 4D:
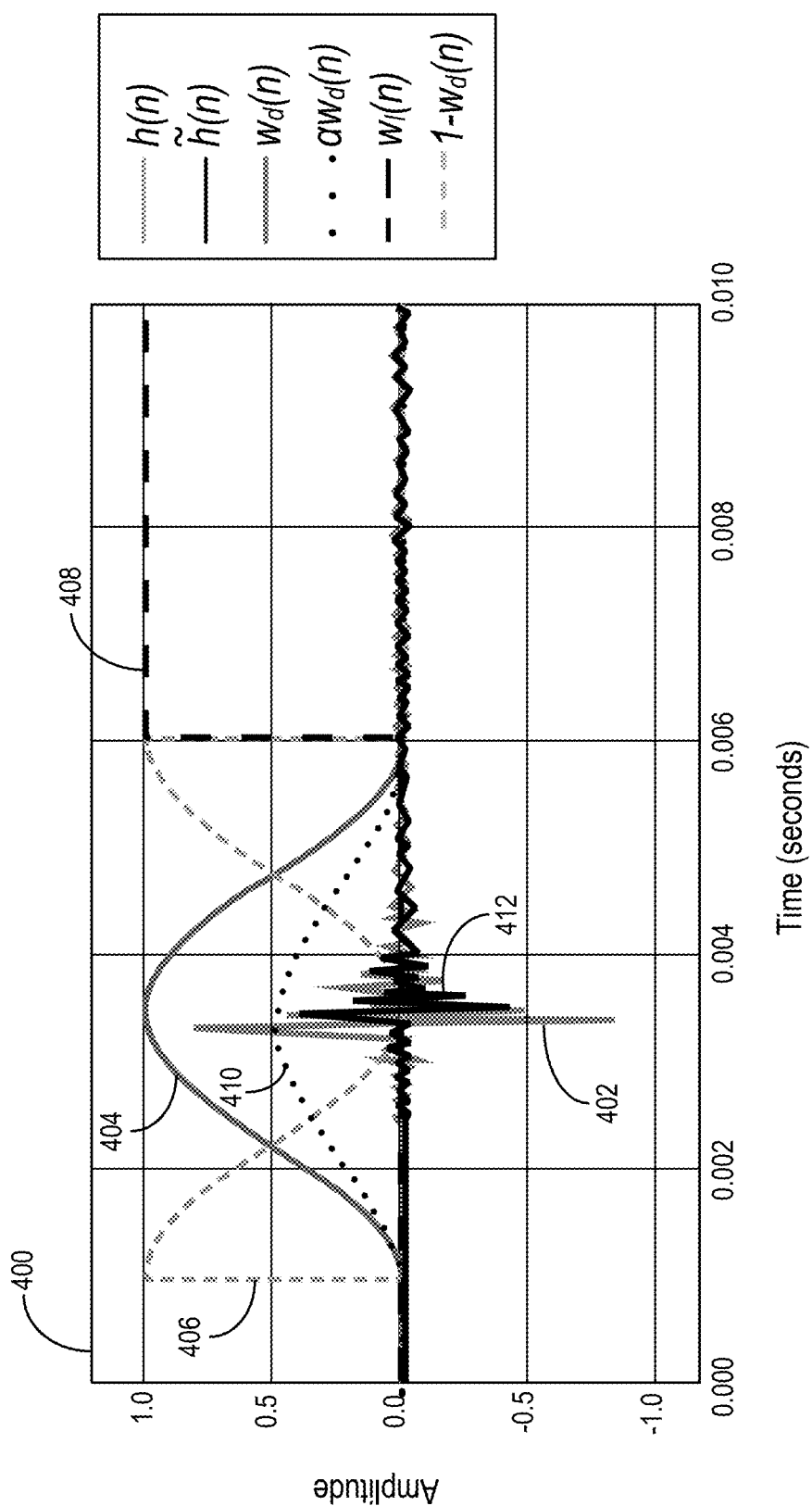

FIG. 4D illustrates the synthetic impulse response 412 within the graph 400. In one or more embodiments, the impulse response system utilizes Equation 6 to calculate the synthetic impulse response 412 based on the direct path window 404 and the residual window 406. To illustrate, because the scalar shown in FIG. 4B is around 0.5, the impulse response system reduces the acoustic impulse response 402 by the full weight of the scalar (e.g., half) in the middle of the direct path window 404 (e.g., at the maximum peak amplitude). Then, as the impulse response system moves away from the center of the direct path window 404, the impulse response system gradually decreases the weight of the scalar proportionally to the direct path window 404 until the scalar is given no weight.

Further, for the same time period, as the impulse response system moves away from the center of the direct path window 404, the impulse response system increases the weight of the acoustic impulse response 402 proportionally to the residual window 406 (and inversely proportionate to the direct path window 404). The residual window 406 functions similar to the direct path window 404. Then, as shown in Equation 6, the impulse response system combines the application of the scaled direct path window 404 and the residual window 406 to the acoustic impulse response 402 to generate the synthetic impulse response 412 (e.g., a synthetic impulse response having a synthetic early-field response portion).

Further, as shown in FIG. 4D, when the late response window 408 switches on (e.g., jumps from zero to one), the direct path window 404 and the residual window 406 both fall to zero. By utilizing the direct path window 404 and the residual window 406 together as shown, when the impulse response system reaches the end of the early response windows, the synthetic impulse response 412 seamlessly transitions to the late response from the acoustic impulse response 402.

Figure 4E:
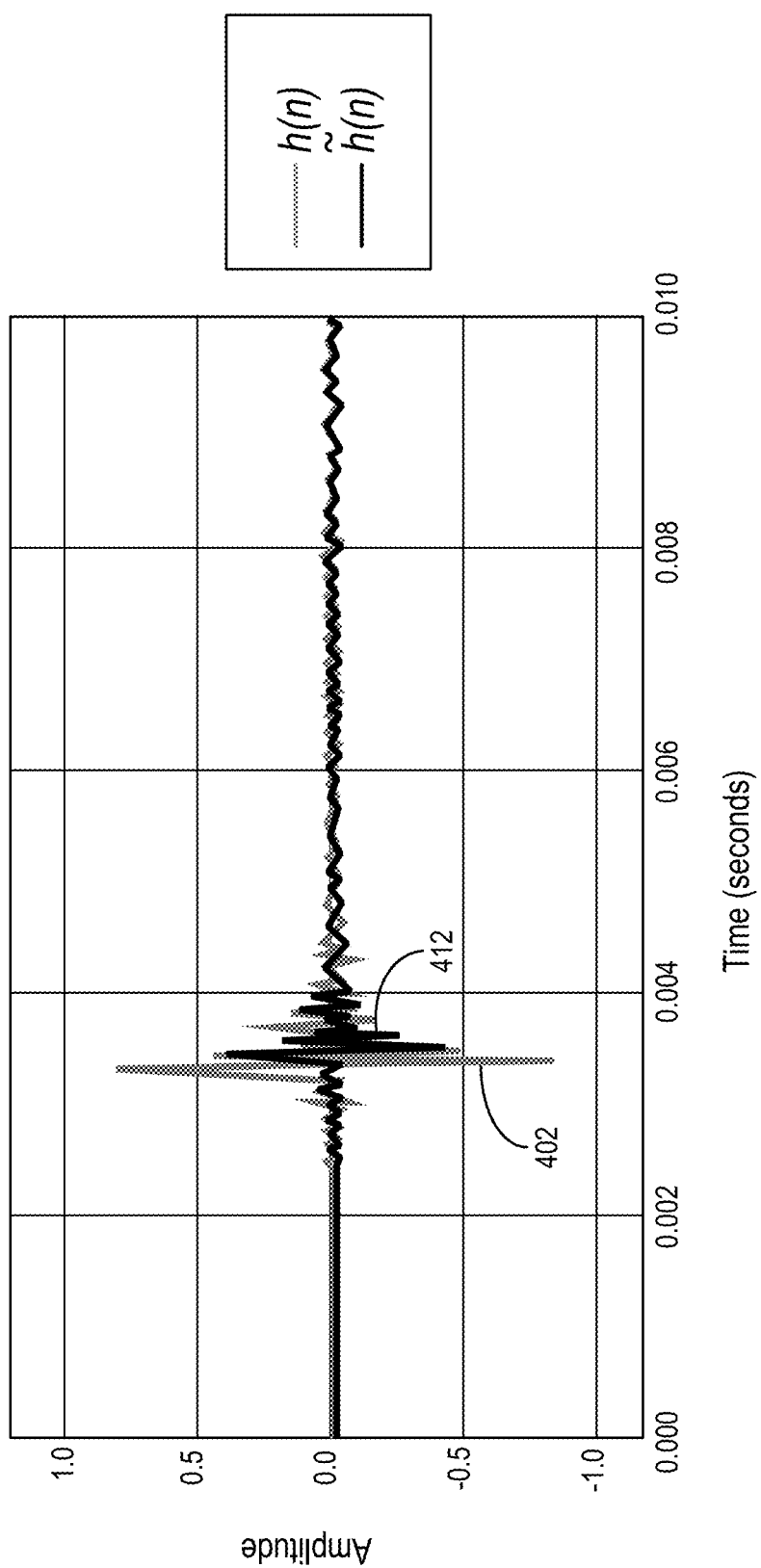

For illustration, FIG. 4E illustrates the acoustic impulse response 402 and the synthetic impulse response 412 without the various windows. As shown, the difference between the acoustic impulse response 402 and the synthetic impulse response 412 is most noticeable at the maximum direct path amplitude, then the synthetic impulse response 412 smoothly adjusts to match the acoustic impulse response 402 by the time of the late response.

As mentioned above, the impulse response system can calculate the scalar (i.e., a) given the acoustic impulse response 402 and a target DRR. In addition, as described above, the impulse response system can apply a scalar to the acoustic impulse response 402 using a window function, such as shown in FIGS. 4A-4E and Equation 6. Utilizing a window function can make calculating the scaler more difficult. However, in these and similar embodiments, the impulse response system can determine the scalar by combining Equation 6 with Equation 4.

To illustrate, in one or more embodiments, the impulse response system plugs Equation 6 into Equation 4. For example, Equation 7 below shows the result of incorporating Equation 6 into Equation 4 and rearranging the arguments to one side of an equation.

$$\alpha^2 \sum_t w_d^2(t) h_e^2(t) + 2\alpha \sum_t [1 - w_d(t)] w_d(t) h_e^2(f) +$$

$$\sum_t (1 - w_d(t))^2 h_e^2(t) - 10^{DRR_{dB}/10} \sum_t h_l^2(t) = 0$$

Further, to solve for the a (i.e., the scalar), the impulse response system can set the DRR in Equation 7 to the target DRR. Then, the impulse response system can isolate the scalar on one side of the equation and solve for the scalar. For instance, in various embodiments, the impulse response system utilizes a quadratic equation to solve for the scalar a. For example, the impulse response system selects the maximum root of the quadratic equation as the scalar a. In this manner, the impulse response system can determine the exact scalar a needed to transform the acoustic impulse response 402 into a synthetic impulse response 412, where the synthetic impulse response 412 has the desired DRR properties.

FIGS. 2-4E describe various embodiments of generating synthetic impulse responses based on a target direct-to-reverberant ratio (DRR) parameter. Moreover, one or more of the actions and algorithms described in connection with FIGS. 2 and 4A-4E provide example structure, architecture, and actions for performing a step for modifying the acoustic impulse response based on a modified direct-to-reverberant ratio.

As described above, the impulse response system can determine one or more scalars, which when applied to an acoustic impulse response, generates synthetic impulse responses having target DRRs. In this manner, the impulse response system can modify the early response of an acoustic impulse response to generate synthetic impulse responses. As also described above, the impulse response system can modify the late response of an acoustic impulse response to generate synthetic impulse responses. In these embodiments, the impulse response system generates synthetic impulse responses by modifying the reverberation time of an acoustic impulse response.

For example, FIGS. 5-7D provide additional details regarding generating a synthetic impulse response based on modifying the reverberation time of an acoustic impulse response. More particularly, FIGS. 5-7D describe the impulse response system generating a synthetic impulse response with a modified reverberation time by changing estimated parameters (e.g., the decay rate parameter and the noise floor parameter) of a reverberation time model (e.g., a T60 measurement model).

Figure 5:
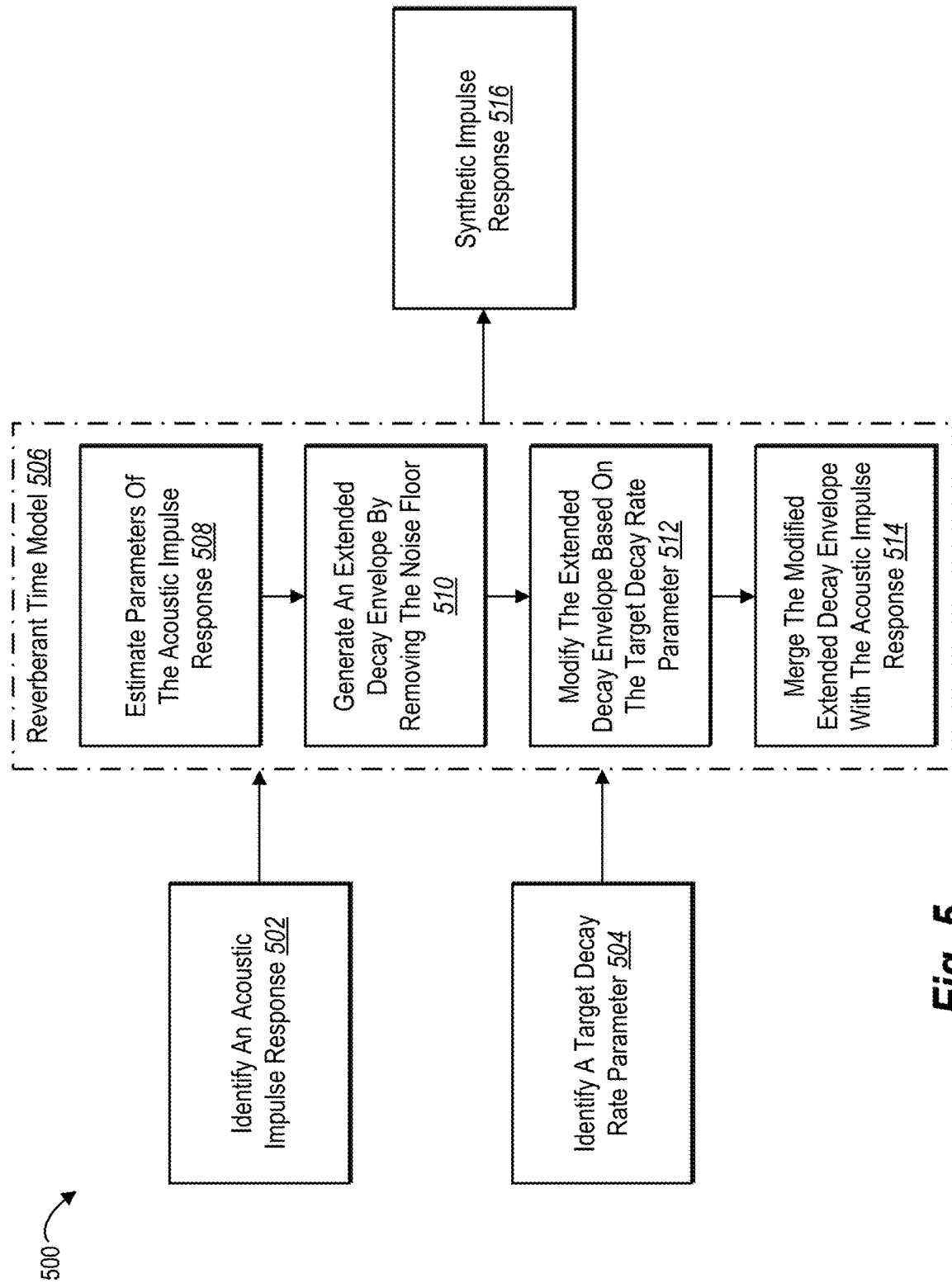
FIG. 5 illustrates an overview of generating synthetic impulse responses based on applying target decay rate parameters in accordance with one or more embodiments.

FIG. 5 provides an overview of generating synthetic impulse responses based on applying target decay rate parameters in accordance with one or more embodiments. More specifically, FIG. 5 includes a block diagram of a series of acts 500 of the impulse response system generating synthetic impulse responses utilizing a reverberation time model 506 that modifies an acoustic impulse response based on applying target decay rate parameters. In one or more embodiments, the impulse response system utilizes the reverberation time model 506 to modify individual frequencies sub-bands of an acoustic impulse response to generate a synthetic impulse response. In some embodiments, the impulse response system utilizes the reverberation time model 506 to modify the full-band (e.g., all of the frequencies sub-bands) of an acoustic impulse response to generate the synthetic impulse response. In other embodiments, the impulse response system utilizes the reverberation time model 506 to modify the frequency-dependent sub-bands of an acoustic impulse response to generate the synthetic impulse response.

As shown, the series of acts 500 includes an act 502 of the impulse response identifying an impulse response system. As provided above, the impulse response system can be located on a client device that captures the acoustic impulse response. In alternative embodiments, the impulse response system receives the acoustic impulse response from a separate computing device (e.g., a client device or a server device) that captures and/or stores the acoustic impulse response. As mentioned above, in various embodiments, the acoustic impulse response can be a synthetic impulse response.

In addition, the series of acts 500 includes an act 504 of the impulse response system identifying a target decay rate parameter (or parameters). For example, the impulse response system receives a target decay rate parameter from user input that indicates a desired decay rate for the acoustic impulse response. For instance, to increase the reverberation time of an acoustic impulse response, a user provides a corresponding target decay rate parameter that changes the late response energy decay of the acoustic impulse response. The target decay rate parameter can correspond to modifying one or more frequency sub-bands or the entire full-band of the acoustic impulse response.

As shown, the series of acts 500 includes an act 508 of the impulse response system estimating parameters of the acoustic impulse response. In one or more embodiments, the impulse response system utilizes a reverberation time model 506 to perform the act 508. In some embodiments, the impulse response system utilizes K-T60 to determine estimated parameters of the acoustic impulse response (as part of or separate from the reverberation time model 506). As described further below, the estimated parameters can include a decay rate parameter, a noise floor parameter, an equalization level parameter, and/or other estimation parameters.

In one or more embodiments, the impulse response system can generate an estimated decay curve or decay envelope utilizing the estimated parameters. For example, the impulse response system plugs the estimated parameters into the reverberation time model 506 to generate the estimated decay envelope corresponding to the acoustic impulse response. Additional detail regarding the reverberation time model is provided below in connection with FIGS. 7A-7D.

In additional embodiments, the impulse response system can also determine a noise floor onset time based on the estimated decay envelope. In general, the noise floor onset time indicates the measured time when the decay of the acoustic impulse response reaches a noise floor. For context, when measuring the reverberation time (e.g., T60) of an acoustic impulse response, the audio signal will decay (e.g., lose energy/amplitude/volume) over time based on characteristics of the recording environment. Given a perfect recording environment with no noise, the acoustic impulse response will steadily decay until the energy level reaches zero. However, most recording environments are not void of noise. Accordingly, the sum of unwanted signals (e.g., audio signals other than that being measured) can combine to form a noise floor in a recording environment. Accordingly, when measuring an acoustic impulse response, the slope of the acoustic impulse response will decrease until it hits a noise floor, which occurs at the noise floor onset time. Additional detail regarding the noise floor onset time is provided below in connection with FIG. 7B.

As shown in FIG. 5, the series of acts 500 includes an act 510 of the impulse response system generating an extended decay envelope by removing the noise floor. For example, in one or more embodiments, the impulse response system sets the noise floor parameter to zero and utilizes the reverberation time model 506 to extend the decay envelope of the estimated decay envelope. An illustrated example of generating an extended decay envelope (i.e., extended estimated decay envelope) with the noise floor removed is shown in FIG. 7C, which is described below.

In addition, the series of acts 500 includes an act 512 of the impulse response system modifying the extended decay envelope based on the target decay rate parameter. For example, in some embodiments, the impulse response system applies the target decay rate parameter within the reverberation time model 506 to generate a modified extended decay envelope (i.e., modified extended estimated decay envelope). In this manner, the impulse response system can undo the measured (e.g., real) decay rate of the acoustic impulse response and impose the target decay rate. Additional detail regarding the extended decay envelope is provided below in connection with FIG. 7D. As mentioned previously, the impulse response system can apply the target decay rate parameter to one or more frequency sub-bands or to the entire full-band of the extended decay envelope.

As also shown in FIG. 5, the series of acts 500 includes an act 514 of the impulse response system merging the modified extended decay envelope with the acoustic impulse response. Because the modified extended decay envelope does not include a noise floor, the audio signal of the modified extended decay envelope can unrealistically trend downward. Accordingly, the impulse response system can merge (e.g., cross-fade) the synthetically generated audio signal with the acoustic impulse response (e.g., a measured audio signal) to generate a realistic synthetic impulse response. Additional detail regarding combining audio signals to generate a realistic synthetic impulse response is provided below in connection with FIG. 7D.

As mentioned above, the impulse response system can generate a synthetic impulse response for an acoustic impulse response based on a target decay rate parameter. To illustrate, FIG. 5 includes the reverberation time model 506 outputting a synthetic impulse response 516. In various embodiments, the impulse response system can generate multiple synthetic impulse responses from the acoustic impulse response. For example, if the impulse response system identifies multiple target decay rate parameters, the impulse response system can generate a corresponding number of synthetic impulse responses for the same acoustic impulse response.

Figure 6:
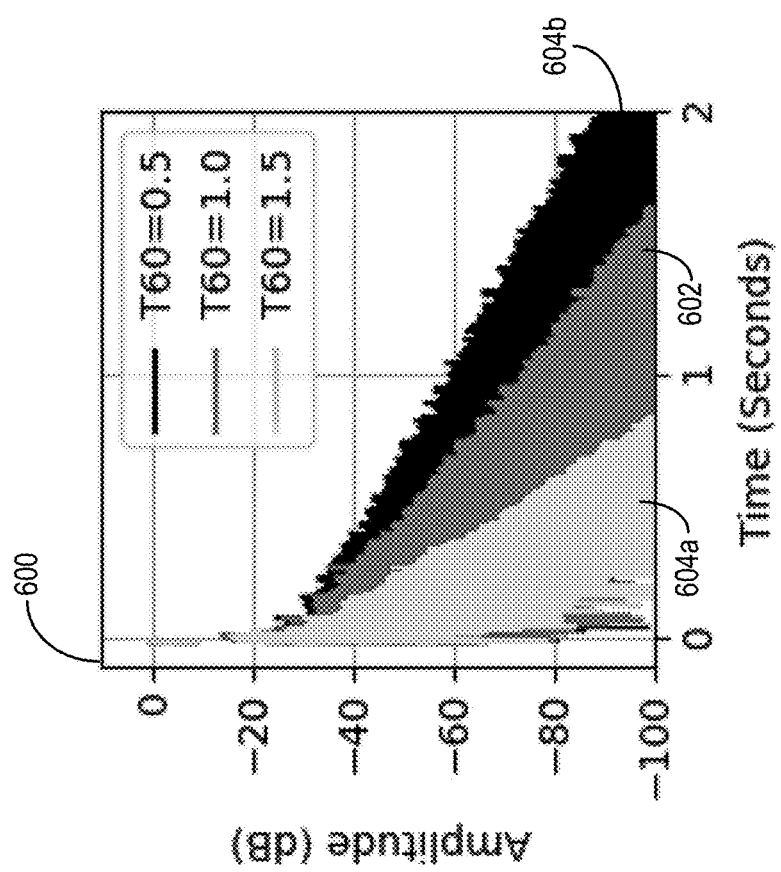
FIG. 6 illustrates examples of modified impulse responses in accordance with one or more embodiments.

FIG. 6 illustrates examples of synthetic audio signals generated by the impulse response system based on modified extended decay envelopes of the reverberation time (e.g., T60) of an acoustic impulse response. As shown, FIG. 6 includes an amplitude-over-time graph 600 of the audio signals with the amplitude is shown in dBs. For example, FIG. 6 includes a synthetic audio signal of an extended decay envelope 602. In addition, FIG. 6 includes a synthetic audio signal of a first modified extended decay envelope 604a and a synthetic audio signal of a second modified extended decay envelope 604b.

By way of context, the graph 600 generally illustrates the late-field response in the impulse responses. For example, the amplitude spike at 0 seconds illustrates the early response while the remainder of the graph reflects the late response. Indeed, the spike approximately at 0 dB on the graph 600 represents the peak amplitude of an acoustic impulse response (e.g., the direct response), from which signal loss (e.g., drop in dBs) is measured.

As shown, the synthetic audio signal of the extended decay envelope 602 utilizes a target decay rate parameter of 1.0, which corresponds to the decay rate parameter of the acoustic impulse response. As also shown, the synthetic audio signal of the first modified extended decay envelope 604a applies a target decay rate parameter (i.e., 1.5) that increases the decay rate. Accordingly, the synthetic audio signal of the first modified extended decay envelope 604a has a reverberation time (e.g., T60 or the time needed for the audio signal to drop 60 dBs) that is smaller than the synthetic audio signal of the extended decay envelope 602. Similarly, the synthetic audio signal of the second modified extended decay envelope 604b applies a target decay rate parameter (i.e., 0.5) that decreases the decay rate. Accordingly, the synthetic audio signal of the second modified extended decay envelope 604b has a reverberation time (e.g., T60) that is larger than the synthetic audio signal of the extended decay envelope 602.

As mentioned above, FIGS. 7A-7D provide additional detail regarding generating a synthetic impulse response with respect to reverberation time (e.g., T60). In particular, FIGS. 7A-7D illustrate generating a synthetic impulse response based on a target decay rate parameter in accordance with one or more embodiments. As shown, FIGS. 7A-7D include a graph 700 showing amplitude (x-axis) over time (y-axis). Similar to FIG. 6, the graph 700 focuses on the late response of an impulse response.

Figure 7A:
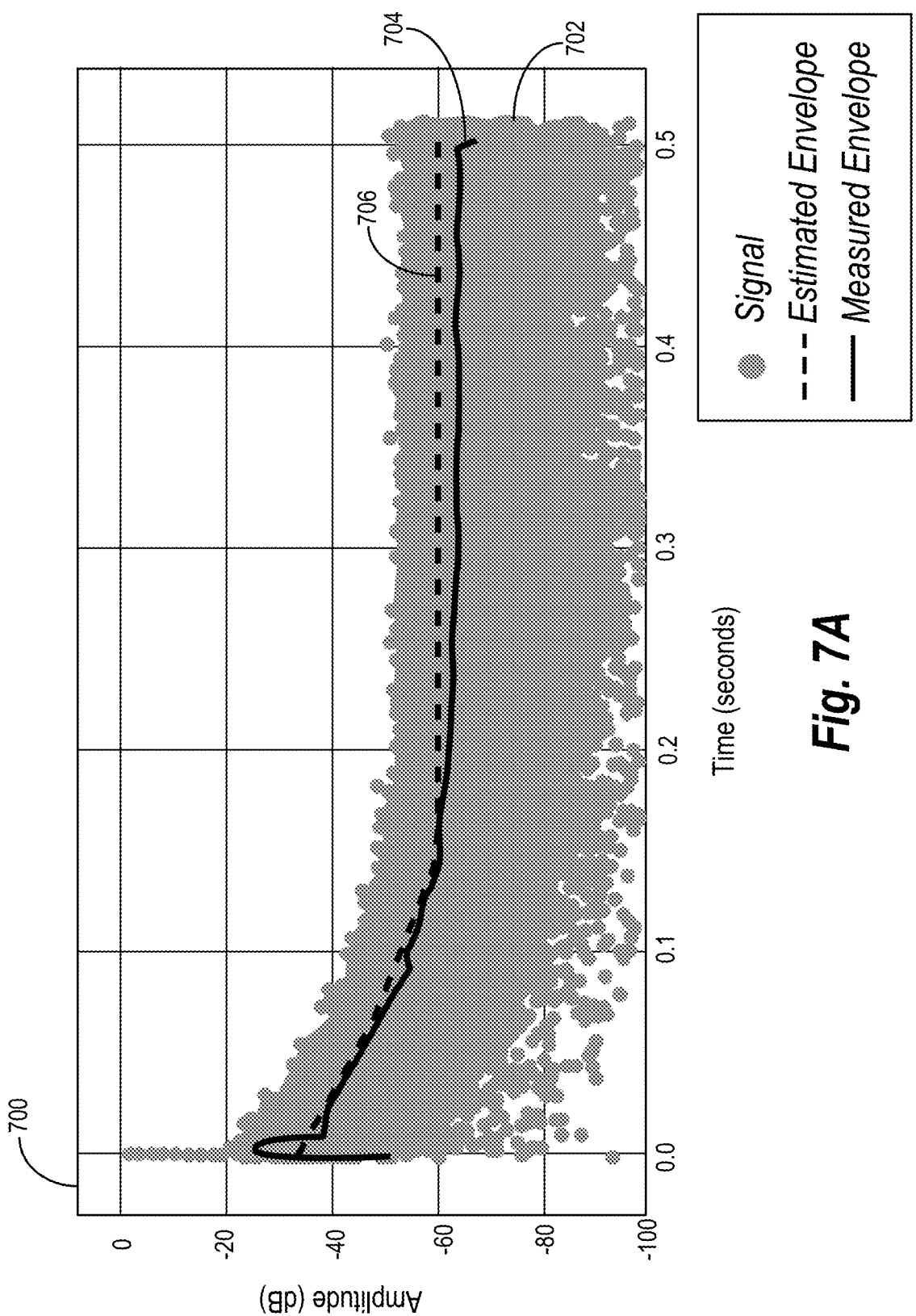
FIGS. 7A-7D illustrate generating synthetic impulse responses based on modifying a target decay rate parameter in accordance with one or more embodiments.

As shown in FIG. 7A, the graph includes an acoustic impulse response represented as its audio signal 702. In addition, the graph 700 includes a measured decay envelope 704 of the acoustic impulse response and an estimated decay envelope 706. In various embodiments, the impulse response system utilizes a reverberation time model (e.g., a T60 measurement model) to determine the estimated decay envelope 706.

For example, the impulse response system can determine and model the estimated reverberation time (e.g., decay time or T60) of an acoustic impulse response in a variety of ways. In one or more embodiments, the impulse response system models the late response (i.e., the late-field response) or $h_r(t)$ of an acoustic impulse response using the reverberation time. For example, the impulse response system models the late response as a frequency-dependent exponentially decaying Gaussian noise with an added noise floor utilizing the reverberation time model, as shown below in Equation 8.

$$h_m(t) = A_m e^{-\frac{t-t_0}{\tau_m}} n(t)u(t-t_0) + \sigma_m n(t) \qquad (8)$$

In Equation 8, $h_m(t)$ can represent the late response for a sub-band frequency at time index t. In addition, $A_m$ can represent an equalization level parameter, $\tau_m$ can represent a decay rate parameter, and $\sigma_m$ can represent a noise floor level. In addition, n(t) can represent a Gaussian random noise with zero mean and unit variance, T60 can equal $\ln(1000)T_s$ (where $T_s$ represents the sampling time), and to can represent the late-field onset time. Further, in Equation 8, m can represent a frequency sub-band index, and u(t) can represent a unit step response.

As mentioned above, the impulse response system can utilize the reverberation time model to determine an estimated decay envelope based on the estimated parameters. For example, the impulse response system determines the decay rate parameter, the noise floor parameter, and the equalization level parameter in Equation 8 to determine the estimated decay envelope for the acoustic impulse response (e.g., a parametrized two-stage energy decay envelope of the acoustic impulse response). In some embodiments, as provided above, the impulse response system can utilize a non-linear optimization method (K-T60) to estimate the decay rate parameter, the noise floor parameter, and the equalization level parameter.

Figure 7B:
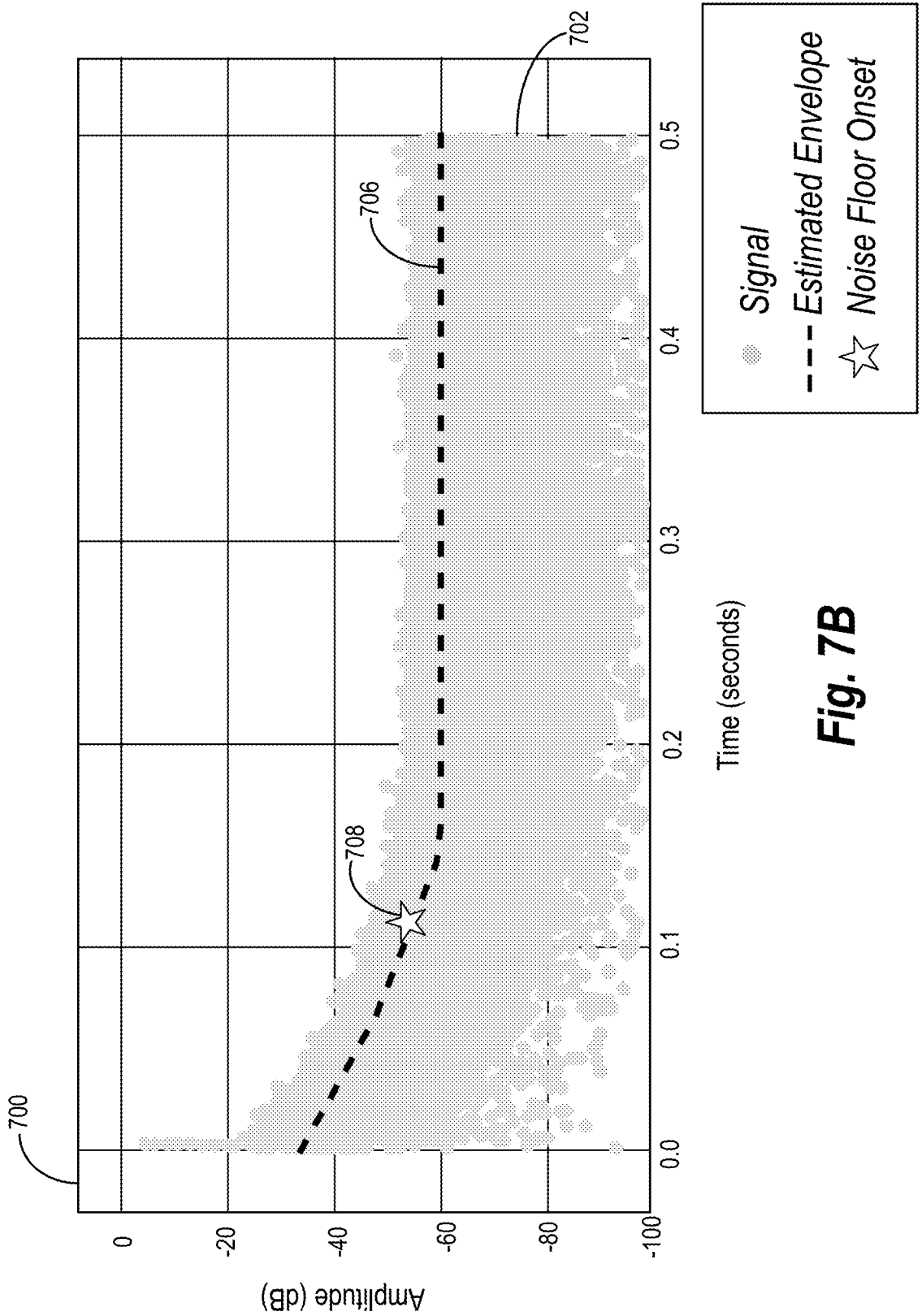
Figure 7C:
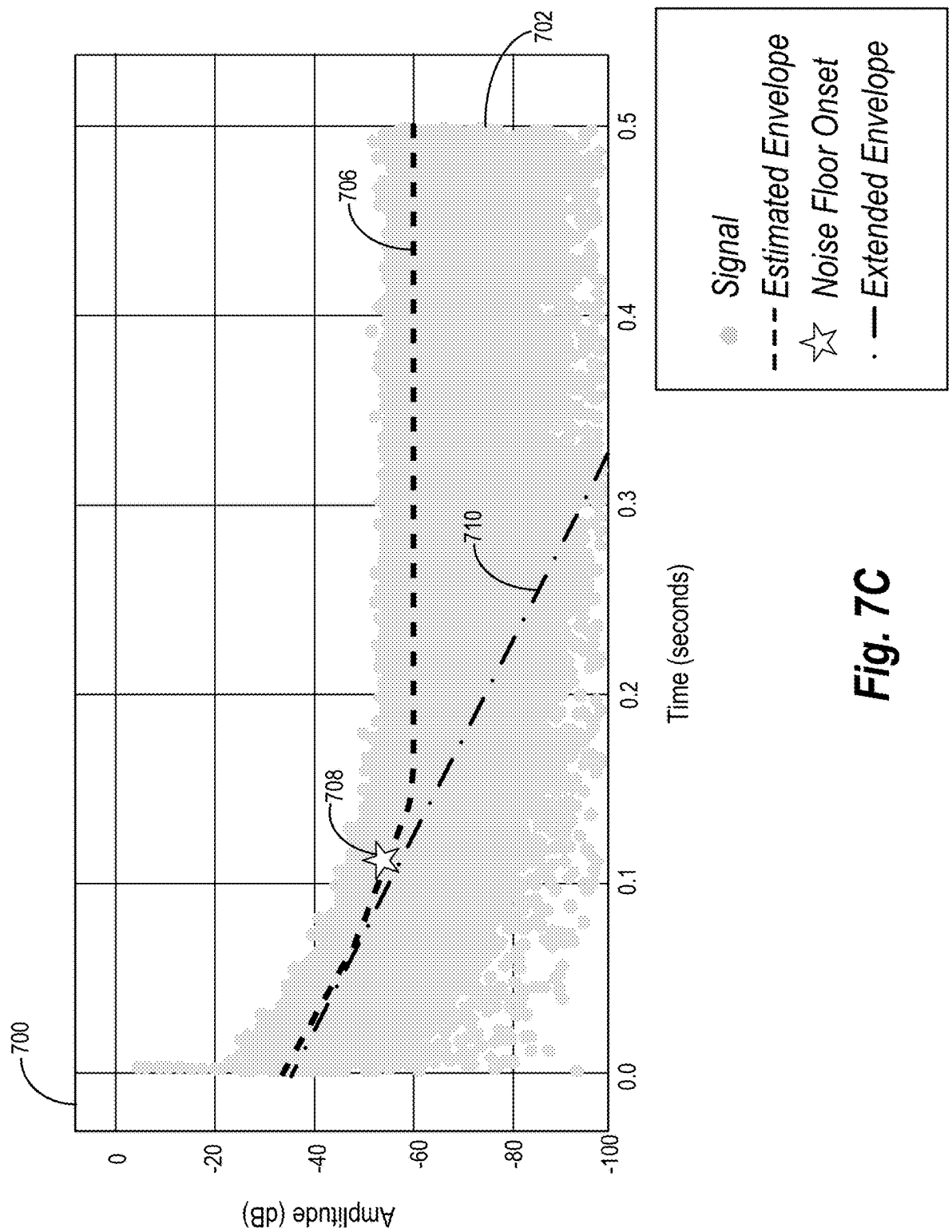
Figure 7D:
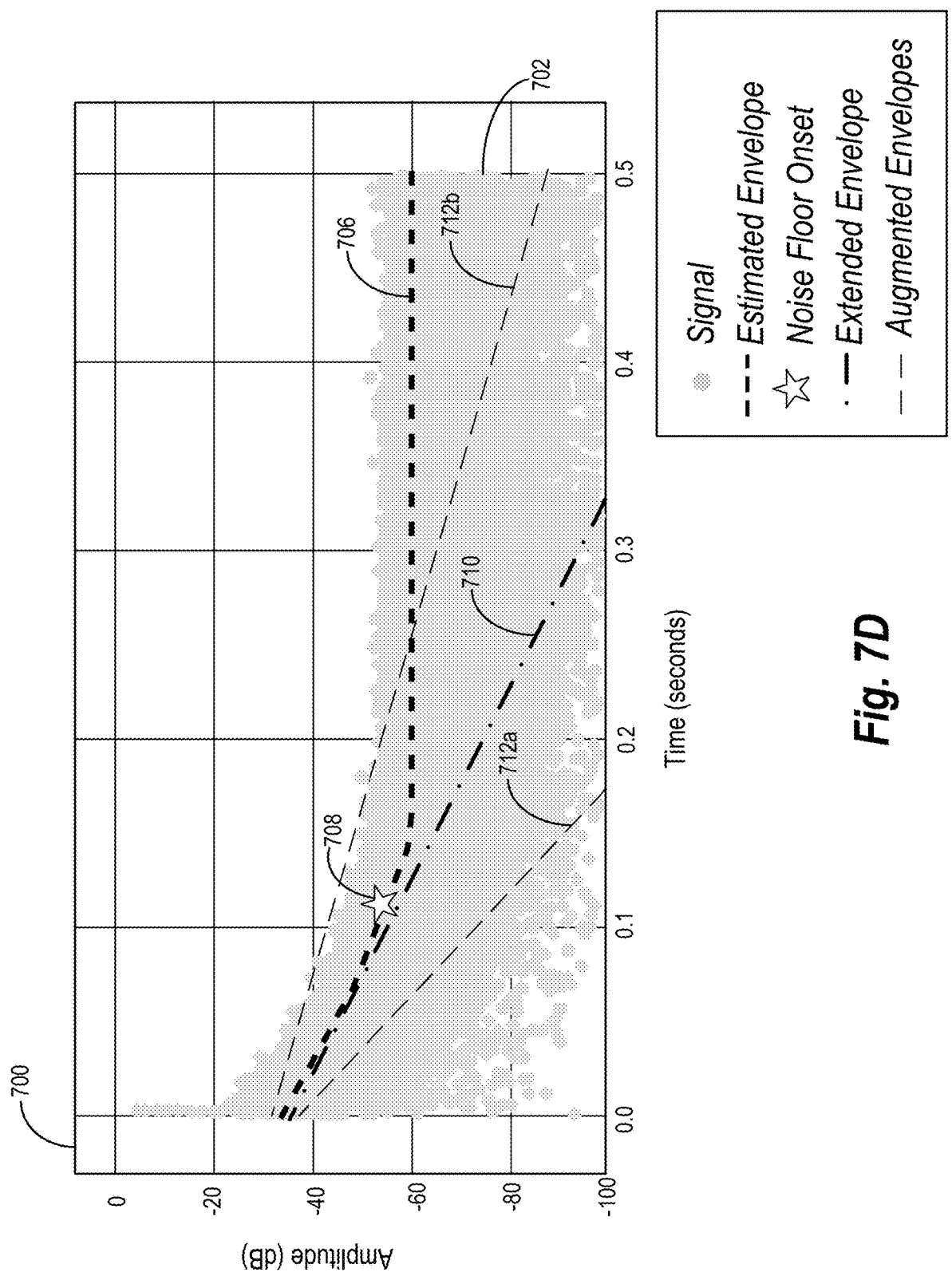

In various embodiments, the impulse response system generates a noise floor onset time from the estimated decay envelope 706, which indicates when the estimated decay envelope 706 hits a noise floor (i.e., unwanted measured signals). To illustrate, FIG. 7B shows the noise floor onset 708 within the graph 700. Notably, for ease in visualizing other elements in the graph 700, the audio signal 702 of the acoustic impulse response has been faded in FIGS. 7B-7D.

In general, the impulse response system determines the noise floor onset time utilizing a numerical search on the estimated decay envelope 706. For example, in one or more embodiments, the impulse response system detects when the slope of the estimated decay envelope 706 changes beyond a threshold value within a given window of time. In other embodiments, the impulse response system determines when the slope of the estimated decay envelope 706 drops below a threshold value. For instance, the impulse response system determines when the slope of the estimated decay envelope 706 flattens out. In some embodiments, the impulse response system finds an intersection time between a decay rate of the estimated decay envelope 706 and a noise floor.

As mentioned above, the impulse response system can determine the extended decay envelope (i.e., extended estimated decay envelope). To illustrate, FIG. 7C adds the extended decay envelope 710 to the graph. As shown, the extended decay envelope 710 extends the estimated decay envelope 706 as if the estimated decay envelope was unaffected by the noise floor. Indeed, the impulse response system can generate the extended decay envelope 710 by setting the noise floor parameter to zero and then utilizing the other estimated parameters (e.g., the decay rate parameter and the equalization level parameter) with regard to Equation 8.

Utilizing the extended decay envelope 710, the impulse response system can determine one or more modified extended decay envelopes (i.e., modified extended estimated decay envelopes). To illustrate, FIG. 7D adds a first modified extended decay envelope 712a and a second modified extended decay envelope 712b to the graph 700. In general, the impulse response system generates a modified extended decay envelope by modifying the decay rate parameter. For example, the impulse response system applies the target decay rate parameter to the extended decay envelope 710 to obtain the first modified extended decay envelope 712a.

Indeed, given the target decay rate parameter and the other estimated parameters in Equation 8, the impulse response system can modify the reverberation time by a growing or shrinking exponential decay (e.g., it appears to change linearly on a logarithmic scale as shown, but it changes exponentially when shown on a linear, non-logarithmic scale). More particularly, in one or more embodiments, the impulse response system can adjust the extended decay envelope 710 by the target decay rate parameter as shown in Equation 9 below.

$$h_m(t) \leftarrow h_m(t) e^{-(t-t_0)\frac{\hat{\tau}_m - \tau_{m,d}}{\hat{\tau}_m \tau_{m,d}}} \quad (9)$$

In Equation 9, $\hat{\tau}_m$ can represent the decay rate parameter estimated from the acoustic impulse response and $\tau_{m,d}$ can represent the desired (i.e., d) or target decay rate parameter for sub-band m. In various embodiments, the impulse response system can determine the full-band decay rate that maintains the frequency-dependent decay shape of the extended decay envelope 710. For example, the impulse response system determines a modification ratio of the target full-band decay (i.e., $\tau_d$) over the estimated full-band decay, as shown in Equation 10 below. In Equation 10, $\hat{\tau}$ (or $\hat{\tau}_M$) can represent the combination (e.g., summation) of each of the sub-bands, forming the full-band.

$$\gamma = \frac{\tau_d}{\hat{\tau}} \quad (10)$$

In additional embodiments, the impulse response system can determine a modified decay rate parameter to apply to each sub-band based on Equation 10. For example, the impulse response system can compute the modified sub-band decay rates as shown in Equation 11 below.

$$\tau_{d,m} = \gamma \hat{\tau}$$

Upon determining the modified sub-band decay rates for each sub-band, in one or more embodiments, the impulse response system can sum each sub-band to determine the modified decay rates for the full-band (all of the frequencies of the signal). Further, once the impulse response system determines and applies the modified decay rate for the full-band (e.g., Equation 9), the impulse response system can recalculate Equation 8 with a modified decay rate to determine the modified extended decay envelope. In some embodiments, the impulse response system can first find modified extended decay envelopes for each sub-band, then sum the sub-bands to determine the full-band modified extended decay envelope (e.g., the first modified extended decay envelope 712a or the second modified extended decay envelope 712b).

As indicated above, the impulse response system can generate one or more modified extended decay envelopes without the presence of a noise floor. Indeed, if the impulse response system fails to remove the noise floor before generating a modified extended decay envelope, the noise floor may adversely influence the creation of the modified extended decay envelope. Accordingly, in various embodiments, the impulse response system determines modified extended decay envelopes without a noise floor, then adds in a noise floor to ensure the resulting synthetic impulse response is realistic and accurate.

To illustrate, after one or more modified extended decay envelopes are determined, the impulse response system can generate a synthetic impulse response (e.g., a synthetic late-field response) based on the modified extended decay envelope. For instance, in one or more embodiments, the impulse response system synthesizes a Gaussian signal (e.g., a noise signal) based on the modified extended decay envelope. For example, the impulse response system imposes the modified extended decay envelope when synthesizing the Gaussian noise signal. In this manner, the impulse response system generates an audio signal that corresponds to the modified extended decay envelope (e.g., a decay envelope modified according to the target decay parameter).

As mentioned above, the impulse response system can add a noise floor to the synthesized audio signal. For instance, in various embodiments, the impulse response system combines the synthesized audio signal for the modified extended decay envelope with the audio signal 702 of the acoustic impulse response. More particularly, the impulse response system can add the noise floor measured within the acoustic impulse response to the synthesized late audio signal reflective of the synthetic late response.

To illustrate, in one or more embodiments, the impulse response system cross-fades the synthesized audio signal of the modified extended decay envelope into the audio signal 702 of the acoustic impulse response at the noise floor onset 708. For example, the impulse response system creates a window at the time of the noise floor onset 708 that smoothly transitions the synthesized audio signal of the modified extended decay envelope into the audio signal 702 of the acoustic impulse response. In some embodiments, the impulse response system can extend the noise floor onset window ahead or behind in time based on the modified extended decay envelope (e.g., depending on the slope steepness) to ensure a smooth transition between the synthetic audio signal and the audio signal 702 of the acoustic impulse response.

In one or more embodiments, the impulse response system utilizes techniques to detect and remove the noise floor, then stitch in a synthesized matching late-field response (e.g., from the audio signal 702 of the acoustic impulse response), as found in Bryan et al., "Methods for extending room impulse responses beyond their noise floor," in *Audio Engineering Society Convention* 129, Audio Engineering Society, 2010 (hereinafter "*Extending Room Impulse Response*"), which is incorporated herein by reference in its entirety. The approach described in Extending Room Impulse Response can be unstable leading to difficulty in performing tasks that involve modifying numerous impulse responses. Accordingly, in some embodiments, the impulse response system can improve upon the above-mentioned techniques by utilizing Extending Room Impulse Response to stitch in a synthesized matching late-field response while utilizing a parametric model (e.g., K-T60) to more accurately and robustly estimate the noise floor, as described previously.

Upon combining the synthesized audio signal for the modified extended decay envelope with the audio signal 702 of the acoustic impulse response, the impulse response system creates a synthetic impulse response that has a different reverberation time from the acoustic impulse response. Moreover, the impulse response system can generate multiple synthetic impulse responses from an acoustic impulse response that increase or decrease the reverberation time.

FIGS. 5-7D describe various embodiments of generating synthetic impulse responses based on a target decay rate parameter. Moreover, one or more of the actions and algorithms described in connection with FIGS. 5 and 7A-7D provide example structure, architecture, and actions for performing a step for modifying the acoustic impulse response based on a modified decay rate parameter.

Figure 8:
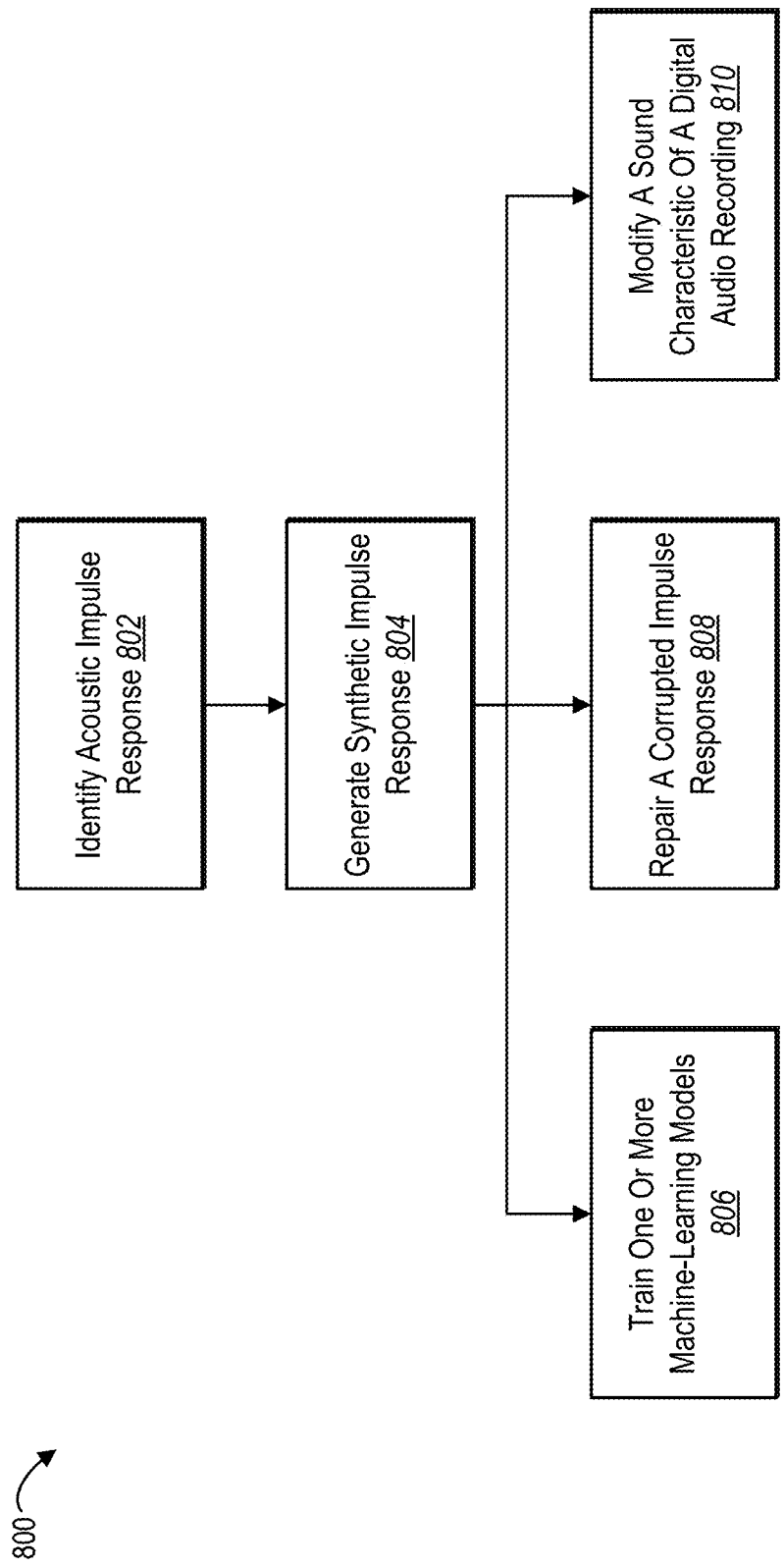
FIG. 8 illustrates utilizing a synthetic impulse response to improve a recording environment and/or an acoustic impulse response in accordance with one or more embodiments.

As mentioned above, the impulse response system can utilize synthetic impulse responses to perform a variety of functions. To illustrate, FIG. 8 shows utilizing a synthetic impulse response in accordance with one or more embodiments. In particular, FIG. 8 shows a series of acts 800 that the impulse response system can perform in utilizing a synthetic impulse response.

As shown in FIG. 8, the series of acts 800 includes an act 802 of the impulse response system identifying an acoustic impulse response, which is described above in connection with FIG. 2 and FIG. 5. In addition, the series of acts 800 includes an act 804 of the impulse response system generating a synthetic impulse response. For example, the impulse response system can generate a synthetic impulse response based on a target DRR (direct-to-reverberant ratio) and/or based on a target decay rate parameter. Additional detail regarding generating synthetic impulse responses is provided above in connection with FIGS. 2-7D.

Upon generating one or more synthetic impulse responses, the impulse response system can perform a variety of functions. For instance, as shown in FIG. 8, the series of acts 800 includes an act 806 of the impulse response system training one or more machine-learning models. For example, the impulse response system utilizes an augmented dataset of synthetic impulse responses to train a machine learning model (e.g., a neural network) to predict DRRs from digital audio recordings (e.g., blind estimations). Similarly, the impulse response system can train a machine learning model to predict reverberation time (e.g., T60) directly from a digital audio recordings. Additional detail regarding training machine-learning models utilizing augmented datasets is provided below in connection with FIGS. 9-10.

As illustrated, the series of acts 800 can also include an act 808 of the impulse response system repairing a corrupted acoustic impulse response. As mentioned above, accurately testing and measuring acoustic impulse responses can be expensive and time consuming. Previously, if a user talked, moved, coughed, opened a door, or otherwise made a noise, the test could be corrupted and need to be restarted. Similarly, if an external noise, such as an airplane overhead, a car alarm or horn, a siren, traffic, or other external sounds were picked up during the test, the test would be invalid.

Because audio corruptions often occur within the late response, the impulse response system can utilize a synthetic impulse response modified based on reverberation time to repair the damaged acoustic impulse response (e.g., repair one or more frequency sub-bands of the acoustic impulse response based on one or more corresponding frequency sub-bands of the synthetic impulse response). To illustrate, the impulse response system can generate a corruption-free synthetic impulse response based on the estimated parameters of the acoustic impulse response, as described above. Further, in some embodiments, the impulse response system can modify the frequency equalization of the acoustic impulse response based on the synthetic impulse response to reconstruct the acoustic impulse response.

In one or more embodiments, the impulse response system can replace the corrupted acoustic impulse response with the corruption-free synthetic impulse response. In alternative embodiments, the impulse response system can detect the corrupted portions of the acoustic impulse response and replace the corresponding portion from the synthetic impulse response. For example, the impulse response system detects an anomaly (e.g., an unwanted amplitude spike) between 4.0-4.5 seconds within the acoustic impulse response. The impulse response system can replace this portion within the corrupted acoustic impulse response with the corresponding portion of the synthetic impulse response that is free of corruption. By repairing corrupted acoustic impulse responses, the impulse response system eliminates the need for test to be repeated when damage or corruption is detected. In reducing the number of tests, the impulse response system provides significant savings, including computational savings.

FIG. 8 also shows an act 810 of the impulse response system modifying a sound characteristic of a digital audio recording based on a synthetic impulse response. For instance, after recording an acoustic impulse response, a user may want to adjust various audio characteristics of the recording. For example, the user desires to make the recording sound as if it originates from a larger or smaller room. As another example, the user desires the sound source (e.g., a speaker) to appear closer or farther away from the microphone. The impulse response system can facilitate these audio characteristic adjustments based on synthetic impulse responses.

To illustrate, if the user desires a larger room effect for a digital audio recording, the impulse response system can increase the reverberation time of the recording (e.g., a longer reverberation time generally indicates a larger room). For example, the impulse response system can generate a synthetic impulse response based on increasing the target decay rate parameter. Then, utilizing the synthetic impulse response, the impulse response system can apply the synthetic impulse response to the digital audio recording to make the recording appear to occur in a larger room.

As another illustration, if a user desires a digital audio recording to sound closer to the microphone, the impulse response system can increase the DRR of the recording (e.g., a higher DRR generally indicates a shorter distance between a sound source and a microphone). For example, the impulse response system can generate a synthetic impulse response based on increasing the target DRR parameter. Again, the impulse response system can apply the synthetic impulse response to the digital audio recording to achieve the desired effect of the user.

In various embodiments, the impulse response system can operate within or part of the acoustic recording system. For example, the acoustic recording system can provide the user with a graphical user interface for editing and modifying audio characteristics of a digital audio recording. When the user selects options to change audio characteristics with respect to the impulse response system, as described above, the impulse response system can modify the digital audio recording until the user is satisfied with the sound of the modified recording.

In one or more embodiments, the impulse response system can be used to modify a digital audio recording to better fit into a desired environment. For example, the impulse response system can modify a digital audio recording to better match a virtual environment (e.g., augmented reality/virtual reality) being experienced by a user. For example, a user may be playing a game where a game character is talking. Depending on whether the game character is indoors or outside (e.g., room size), in close proximity to the user or farther away, the impulse response system can modify the speech of the game character to match the virtual environment.

Furthermore, while this disclosure describes digital audio recording, the impulse response system can also modify and/or augment digital audio on-the-fly (e.g., in real-time or near-real-time). For instance, the impulse response system can serve as an equalizer to adjust, balance, and/or modify sound for a user. For example, the impulse response system can be utilized during a conference call to make a speaker appear closer to the microphone enabling participants to better hear the speaker.

Figure 9:
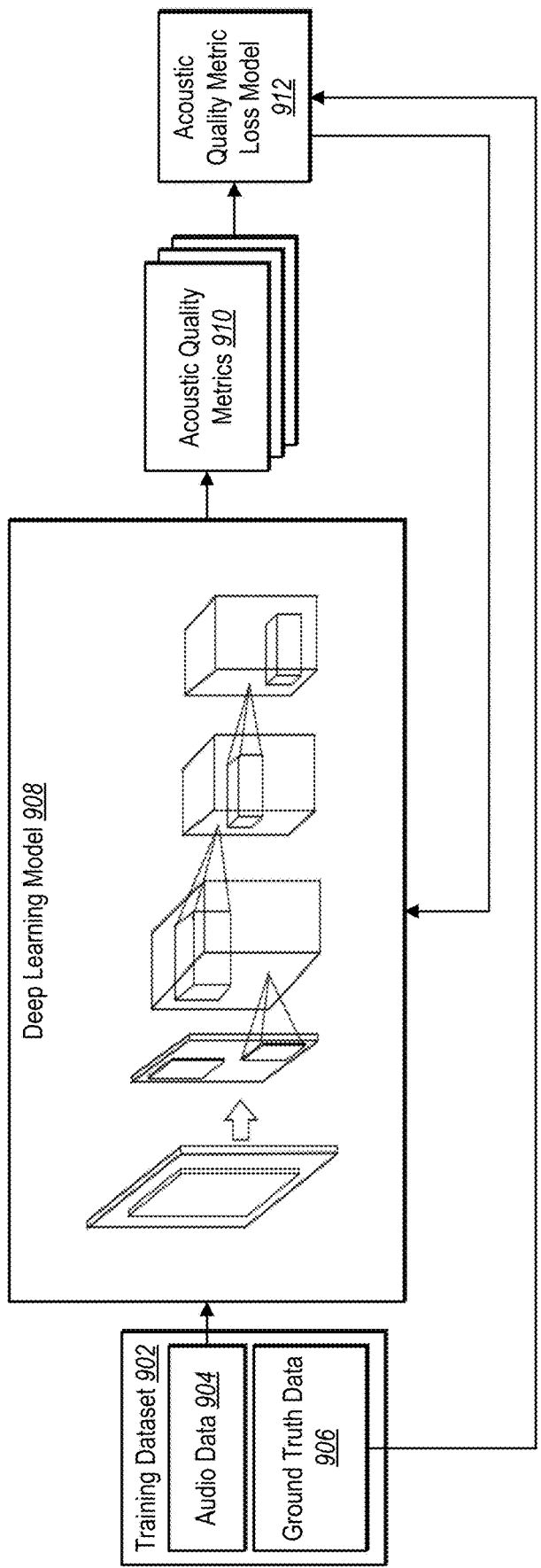
FIG. 9 illustrates utilizing a dataset of augmented impulse responses to accurately train a deep learning model in accordance with one or more embodiments.

As mentioned above, the impulse response system can utilize synthetic impulse responses to train one or more machine-learning models. To illustrate, FIG. 9 shows utilizing a dataset of augmented impulse responses to accurately train a deep learning model in accordance with one or more embodiments. Indeed, the impulse response system can train a deep learning model to accurately perform blind estimations directly from speech utilizing synthetic impulse responses.

To illustrate, FIG. 9 shows training a deep learning model (e.g., neural network) to estimate acoustic quality metrics (e.g., DRR and T60) from audio data (e.g., digital audio recordings). As shown, FIG. 9 includes training a deep learning model 908. In some embodiments, the deep learning model 908 is a DRR convolutional neural network to predict DRRs from digital audio recordings. In alternative embodiments, the deep learning model 908 is a reverberation time convolutional neural network to predict reverberation times (e.g., T60) directly from the digital audio recordings.

As shown, FIG. 9 includes the training dataset 902 that includes audio data 904 (e.g., speech data convolved with random noise and acoustic impulse responses) and ground truth data 906 (e.g., DRRs and T60s). In addition, FIG. 9 includes acoustic quality metrics 910 that can correspond to DRRs or T60s output from the deep learning model 908 given the audio data 904. Further, FIG. 9 includes an acoustic quality metric loss model 912. Once trained, the impulse response system can remove the acoustic quality metric loss model 912 and utilize the deep learning model 908 to generate DRRs or T60s (e.g., acoustic quality metrics 910) directly from digital audio recordings.

In one or more embodiments, the impulse response system generates or otherwise obtains the training dataset 902. For example, the training dataset 902 includes a mixture of speech, noise, and acoustic impulse responses collected separately. In some instances, the impulse response system accesses the speech content, and utilizes various speakers (e.g., 20 speakers) reading from stories (e.g., from the public domain). In addition, the impulse response system can generate the background noise, and/or use pre-recorded noise from a sound repository. Further, the impulse response system can utilize a number (e.g., 7,000) of synthetically generated acoustic impulse responses to train one or more deep learning models. In some embodiments, the impulse responses can be generated to have uniformly random statistics (e.g., yielding a DRR between −6-8 dB along with a T60 between 0.1-1.5 seconds).

Moreover, the training dataset 902 can be separated into training, testing, and validation partitions. Further, in some embodiments, the individual speech and noise recordings are sliced into non-overlapping eight-second clips, where the first six seconds of silence of each file are discarded. As an example, 1,007 training noise files, 257 validation noise files, and 316 raw test noise files are generated; 4,480 training impulse response files, 1,120 validation impulse response files, and 1,400 raw test impulse response files are generated; and 1,130 training speech files, 388 validation speech files, and 369 raw test speech files are generated.

In various embodiments, for each dataset partition (e.g., training, validation, and testing), each speech recording can be randomly sampled with noise and an acoustic impulse response recording. The speech can then be convolved with the acoustic impulse response, circularly shifted by a random noise amount, and have scaled noise added (e.g., imposing a signal-to-noise ratio (SNR) uniformly distributed between 20--5). In some embodiments, the SNR computation is based on one or more standards (e.g., ITU-T P.56 Specification) for the speech level and a root mean square (RMS) estimator for the noise level. Once mixed, a four-second segment can be randomly sampled from the mixture to produce a final data sample, reselecting any short segment with an RMS level below 20 dB for the full-length segment. In additional embodiments, the data generation process can be repeated numerous times. For example, upon repeating the above process 50 times, 56,500 training data samples, 19,400 validation data samples, and 18,450 test data samples can be generated.

As mentioned above, the impulse response system can utilize the training dataset 902 to train each of the deep learning models. For example, in various embodiments, the impulse response system utilizes the segment set of the training dataset 902 to train the reverberation time model (e.g., a T60 measurement model) and the direct-to-reverberant ratio (DRR) model. In many embodiments, these deep learning models share front-end feature extraction, network architecture, a regression-based cost function, and training procedures to predict T60 and DRR (i.e., the acoustic quality metrics 910).

In one or more embodiments, the impulse response system performs pre-processing. For example, in various embodiments, the acoustic improvement utilizes a Mel-frequency warped spectrogram representation (or simply Mel-spectrogram) for front-end feature extraction of the deep learning models. In other words, the impulse response for each mixture sample can be converted into a Mel-frequency spectrogram representation. For instance, the impulse response system can utilize a relatively low-frequency resolution short-time Fourier transform (STFT) with a fast Fourier transform (FFT) of 256 samples (e.g., a Hann window), a hop size of 128 samples (e.g., 8 ms) of 16 kHz, with 32 bands, and area normalization. Further, the impulse response system can compute the power in decibels, which can result in a 32×499 matrix feature representation.

In alternative embodiments, the impulse response system can optionally normalize each sample by the mean and standard deviation of the training dataset 902. Notably, in some embodiments, the impulse response system can remove the front-end feature extraction and allow the network to learn an optimal filterbank representation. However, given the long signal input (e.g., 4 seconds), by utilizing the Mel-spectrogram front-end extraction, the impulse response system can achieve computational savings. Indeed, the impulse response system can use data normalization as well as circularly buffer the Mel-spectrogram front-end extraction, which further reduces computational costs.

In one or more embodiments, the impulse response system generates a deep learning model 908 that is a convolutional neural network (CNN). For example, the network architecture can include six 2D convolutional layers, each followed by a rectified linear activation function (e.g., ReLU) layer, max-pooling layer, and batch normalization layer (e.g., neural network layers of the deep learning model 908). In some embodiments, the first four convolutional and/or pooling layers can reduce the dimension of the time-axis only until the time and frequency axes are approximately the same dimension. In additional embodiments, the last two convolutional and/or pooling layers can then reduce the dimension over both time and frequency.

After the convolutional layers, the impulse response system can utilize a dropout layer (e.g., 50%) and a fully connected layer to predict a scalar value. In some embodiments, the max pooling size is identical to the convolutional layer filter size for each layer, respectively. At a high-level, the convolutional layers can be used to extract audio features that are useful in predicting the T60 or DRR (i.e., the acoustic quality metrics 910), while the latter dense layer can perform linear regression in the extracted feature space. A full specification of the convolutional layers is outlined in Table 1 below.

TABLE 1

|  | Conv. Layer 1-2 | Conv. Layer 3-5 | Conv. Layer 5 |
|---|---|---|---|
| Number of Filters | 8 | 16 | 32 |
| Size | 1 × 2 | 1 × 2 | 2 × 2 |

With respect to training the deep learning model 908, by following the convolutional neural network layer specification of Table 1, the impulse response system can achieve 8,513 trainable parameters and 224 non-trainable parameters given the training dataset 902 described above. For example, given the architecture shown in Table 1, the impulse response system can train the deep learning model 908 to minimize cross-entropy loss via the acoustic quality metric loss model 912 (e.g., using an ADAM optimizer over 500 iterations).

As briefly mentioned above, the impulse response system can train the deep learning model 908 utilizing the acoustic quality metric loss model 912. In particular, with regard to FIG. 9 the impulse response system utilizes the acoustic quality metric loss model 912 to provide feedback based on the accuracy of the acoustic quality metric estimations. For example, the impulse response system utilizes the acoustic quality metric loss model 912 to determine an estimation error amount between the acoustic quality metrics 910 predicted by the deep learning model 908 and ground truth data 906 provided the training dataset 902. Then, utilizing the estimation error amount, the impulse response system iteratively updates the tunable weights parameters of the various layers of the deep learning model 908 until the error amount is minimized, a timer is reached, or the number of iterations reaches a predetermined limit.

To compare the deep learning model 908 to state-of-the-art systems, experimenters tested embodiments of the deep learning model 908 trained as both a DRR prediction model and a T60 (i.e., reverberation time) prediction model. In particular, the inventors tested the deep learning models with respect to bias, mean square error (MSE) and Pearson correlation coefficient (i.e., $\rho$).

Prior to comparison, a ground truth estimator was used to generate new training data. For example, full-band T60 and DRR estimates were computed directly from 700 single-channel (i.e., 70 multi-channel) synthetic impulse responses generated by the impulse response system (i.e., T60 and DRR implementations of the deep learning model 908). Each implementation was then tuned to best fit the ground truth labels provided by the dataset corpus via linear regression (e.g., slope and intercept) to generate an accurate ground truth.

In testing bias, MSE, and the Pearson correlation coefficient (i.e., $\rho$), the experimenters found the T60 results of the impulse response system outperformed state of the art systems, as shown in Table 2 below. For reference, MLP in Table 2 refers to Xiong et al., "Joint estimation of reverberation time and direct-to-reverberation ratio from speech using auditory-inspired features," in *ACE Challenge Workshop, A Satellite Event of Workshop on Applications of Signal Processing to Audio and Acoustics* (WASPAA), IEEE, 2015. QA Reverb refers to Prego et al., "Blind estimators for reverberation time and direct-to-reverberant energy ratio using subband speech decomposition," in *Applications of Signal Processing to Audio and Acoustics* (WASPAA), 2015 IEEE, pp 1-5. GT-CNN refers to Gamper et al., "Blind reverberation time estimation using a convolutional neural network," in the 2018 *16th International Workshop on Acoustic Signal Enhancement* (IWAENC), IEEE, 2018, pp. 136-140.

TABLE 2

| Method | Bias | MSE | $\rho$ |
|---|---|---|---|
| MLP | −0.0967 | 0.104 | 0.48 |
| QA Reverb | −0.068 | 0.0648 | 0.778 |
| GT-CNN | 0.0304 | 0.0384 | 0.836 |
| Impulse Response System | −0.007 | 0.0265 | 0.910 |

With respect to the DRR test, the experimenters found that DRR estimation results of the impulse response system outperformed the state-of-the-art single-channel systems (e.g., NIRAv2) in terms of bias, MSE, and correlation as well as outperformed the state-of-the-art multi-channel systems (PSD) in terms of bias and correlation, with comparable MSE, as shown below with respect to Table 3. For reference, PSD refers to Hioka et al., "PSD estimation in beamspace for estimating direct-to-reverberant ratio from a reverberant speech signal," 2015 and NIRAv2 refers to Parada et al, "Evaluating the non-intrusive room acoustics algorithm with the ace challenge," in *ACE Challenge Workshop, A Satellite Event of Workshop on Applications of Signal Processing to Audio and Acoustics* (WASPAA), IEEE, 2015.

TABLE 3

| Method | Bias | MSE | $\rho$ |
|---|---|---|---|
| PSD | 1.07 | 8.14 | 0.577 |
| NIRAv2 | −1.85 | 14.8 | 0.558 |
| Impulse Response System | 0.71 | 9.42 | 0.690 |

Notably, when the experimenters were running the evaluation, they updated the estimator of the impulse response system every half second and used the median of all segments to compute the estimate for each file. For any evaluation examples shorter than four seconds, the example was repeated until it was greater than four seconds. In addition, in terms of computational complexity, the reported real-time factor of the impulse response system was 0.010 or 100× real-time for T60 and DRR (independently). Further, because the front-end feature extraction can be shared between the two estimators (e.g., T60 and DRR), the computation to run both estimators was less than the sum of the parts. For example, while not directly comparable to past results, these results indicate that the front-end feature extraction and deep learning model 908 of the impulse response system is very efficient compared to alternative methods and runnable in real-time. For example, compared to the GT-CNN system, the impulse response system is about five times (i.e., 5×) faster while also being more accurate.

Figure 10:
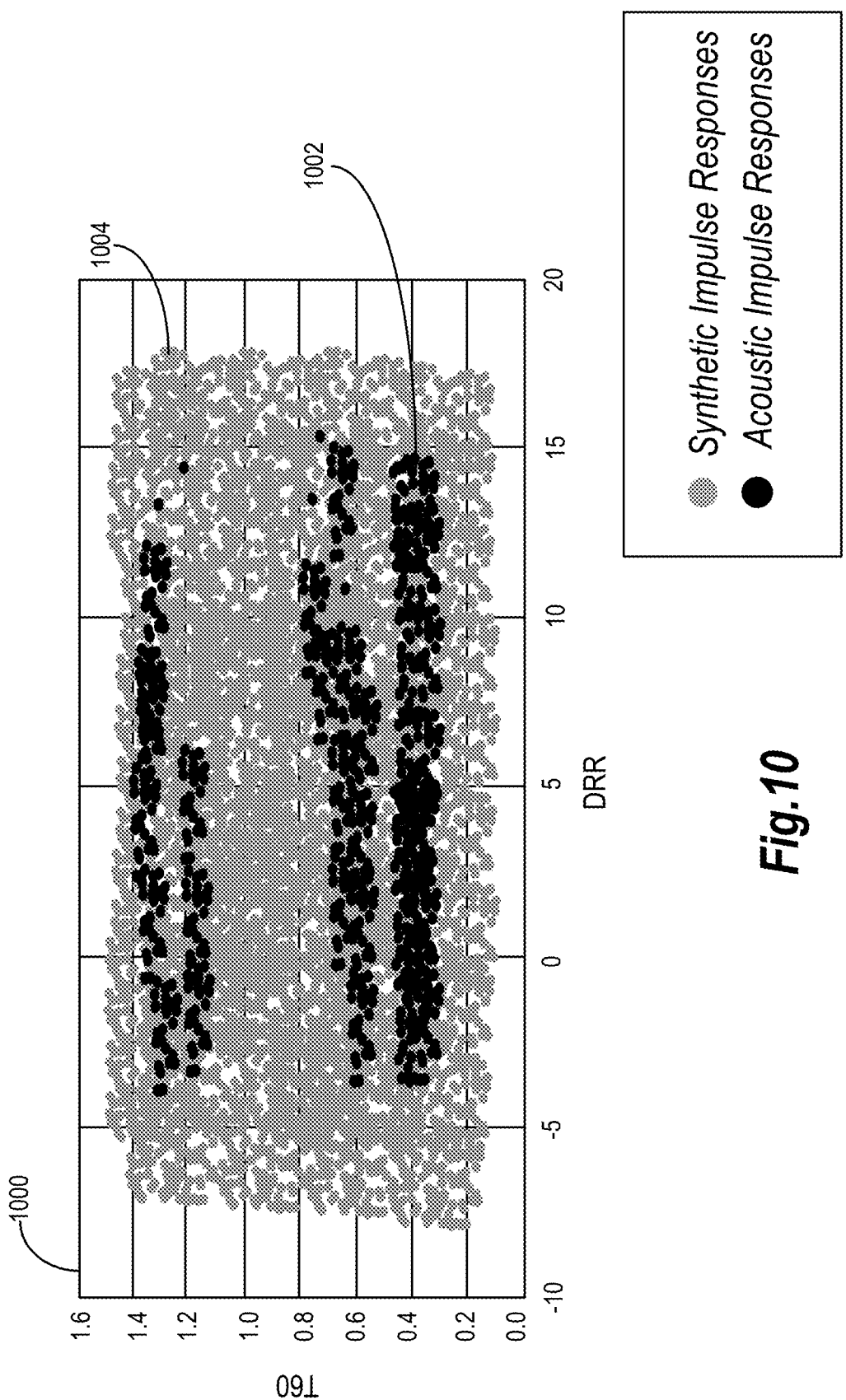
FIG. 10 illustrates a histogram of synthetic impulse responses and measured acoustic impulse responses in accordance with one or more embodiments.

As mentioned above, in some embodiments, the impulse response system can generate a diverse, balanced, and realistic training dataset. To illustrate, FIG. 10 shows a histogram of synthetic impulse responses and measured acoustic impulse responses in accordance with one or more embodiments. In particular, FIG. 10 shows a representative distribution of T60 (i.e., reverberation time) and DRR values for synthetic impulse responses generated by the impulse response system within an augmented dataset.

As shown in FIG. 10, the histogram 1000 includes measured impulse responses 1002 (e.g., acoustic impulse responses) from a limited dataset of acoustic impulse responses. Further, the histogram 1000 includes synthetic impulse responses 1004 generated by the impulse response system. Notably, the measured impulse responses 1002 and the synthetic impulse responses 1004 shown in the histogram 1000 are representative of an augmented dataset.

As shown, the measured impulse responses 1002 are unbalanced and small in number (e.g., 700 in number). As a result, the impulse response system could not accurately train a deep learning model based on the measured impulse responses 1002. In contrast, the synthetic impulse responses 1004 are abundant (e.g., 7000 in number) and balanced (e.g., uniformly distributed) across the dataset in both T60 values and DRR values. Accordingly, the impulse response system can utilize the augmented dataset of realistic synthetic impulse responses to train the deep learning models to accurately predict blind estimates for both T60 values and DRR values.

Figure 11:
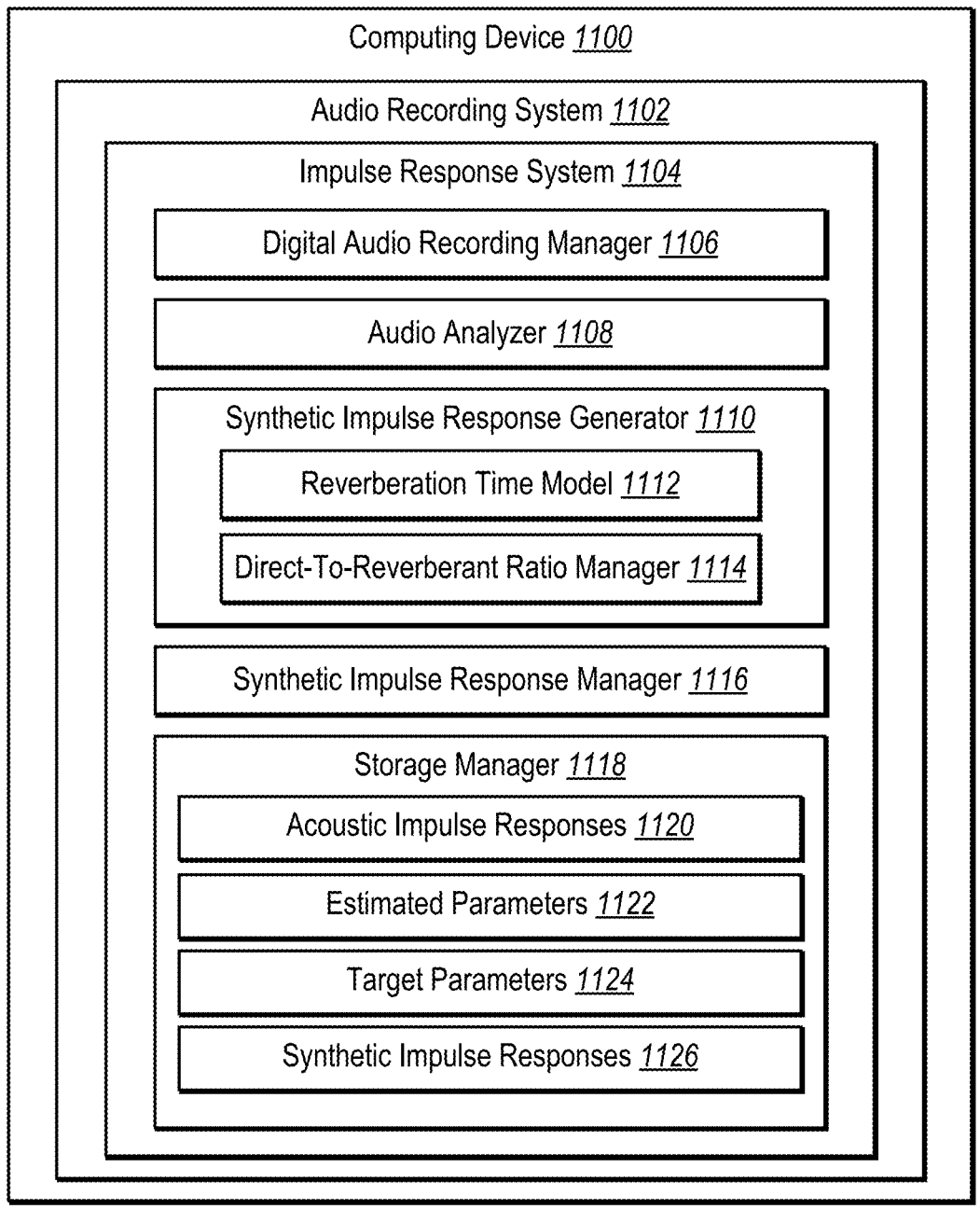
FIG. 11 illustrates a schematic diagram of an impulse response system in accordance with one or more embodiments.

Referring now to FIG. 11, additional detail is provided regarding the capabilities and components of an impulse response system 1104 in accordance with one or more embodiments. In particular, FIG. 11 shows a schematic diagram of an example architecture of the impulse response system 1104 implemented within an audio recording system 1102 and hosted on a computing device 1100. The impulse response system 1104 can represent one or more of the impulse response systems previously described.

In addition, the computing device 1100 may represent various types of computing devices. For example, in some embodiments, the computing device 1100 is a mobile computing device, such as a laptop, a tablet, a mobile telephone, a smartphone, etc. In one or more embodiments, the computing device 1100 is a non-mobile computing device, such as a server, a cluster of servers, a desktop, or another type of non-mobile computing device. Additional details with regard to the computing device 1100 are discussed below with respect to FIG. 14.

As shown, the computing device 1100 includes the audio recording system 1102. While not shown, in some embodiments, the computing device 1100 can also include a microphone. For example, the computing device 1100 includes one or more integrated microphones (e.g., an internal microphone). In alternative embodiments, the computing device 1100 can be connected (e.g., wired or wireless connection) to an external microphone.

The audio recording system 1102, in various embodiments, can capture, record, play, edit, modify, delete, store, share, receive, transmit, and/or import digital audio recordings (as well as live/real-time non-recorded audio). For example, the audio recording system 1102 is in communication with audio capturing hardware to capture speech from a user. In general, the audio recording system 1102 can facilitate capturing digital audio recordings on the computing device 1100.

As illustrated in FIG. 11, the impulse response system 1104 includes various components for performing the processes and features described herein. For example, the impulse response system 1104 includes a digital audio recording manager 1106, an audio analyzer 1108, a synthetic impulse response generator 1110 having a reverberation time model 1112 and a direct-to-reverberant ratio model 1114, an impulse response manager 1116, and a storage manager 1118. As shown, the storage manager 1118 includes acoustic impulse responses 1120, estimated parameters 1122, target parameters 1124, and synthetic impulse responses 1126. Each component is described below in turn.

As shown, the impulse response system 1104 includes the digital audio recording manager 1106. In various embodiments, the digital audio recording manager 1106 can capture, record, store, playback, remove, and/or delete one or more digital audio recordings including acoustic impulse responses 1120. In some embodiments, the digital audio recording manager 1106 communicates with the audio recording system 1102 to capture one or more acoustic impulse responses 1120. In alternative embodiments, the digital audio recording manager 1106 can import one or more acoustic impulse responses. For example, the digital audio recording manager 1106 can receive a dataset of acoustic impulse responses 1120. Further, as shown the acoustic impulse responses 1120 can be stored and accessed via the storage manager 1118.

As shown, the impulse response system 1104 includes the audio analyzer 1108. In one or more embodiments, the audio analyzer 1108 determines, identifies, measures, quantifies, analyzes, calculates, and/or estimates the acoustic quality of a digital audio recording (e.g., an acoustic impulse response) utilizing one or more acoustic quality measurement models. For example, the audio analyzer 1108 can determine estimated parameters 1122 (e.g., a decay rate parameter, a noise floor parameter, an equalization level parameter, and/or a noise floor onset time) of an acoustic impulse response (or an estimated decay envelope), as detailed above.

As shown in FIG. 11, the impulse response system 1104 includes the synthetic impulse response generator 1110. In various embodiments, the synthetic impulse response generator 1110 creates, modifies, generates, determines, edits, removes, and/or repairs synthetic impulse responses 1126. For instance, the synthetic impulse response generator 1110 utilizes the reverberation time model 1112 (e.g., a T60 measurement model) and/or direct-to-reverberant ratio model 1114 to generate synthetic impulse responses 1126, as detailed above. As an example, the synthetic impulse response generator 1110 generates a synthetic impulse response from an acoustic impulse response utilizing the reverberation time model 1112 based on the estimated parameters 1122 and the target parameters 1124 (e.g., a target reverberation time or decay rate parameter). As another example, the synthetic impulse response generator 1110 generates a synthetic impulse response from an acoustic impulse response utilizing the direct-to-reverberant ratio model 1114 based on the target parameters 1124 (e.g., a target DRR).

As also shown, the impulse response system 1104 includes the impulse response manager 1116. In one or more embodiments, the impulse response manager 1116 stores, accesses, applies, utilizes, repairs, and/or modifies impulse responses based on synthetic impulse responses 1126. Further, the impulse response manager 1116 can train a deep learning model utilizing an augmented dataset of synthetic impulse responses 1126, as described above. In addition, the impulse response manager 1116 can repair an acoustic impulse response based on a synthetic impulse response, as described above. Moreover, the impulse response manager 1116 can modify a digital audio recording based on a synthetic impulse response, as described above.

As shown in FIG. 11, the impulse response system 1104 includes the storage manager 1118. As mentioned, the storage manager 1118 (e.g., via one or more memory devices) includes the acoustic impulse responses 1120, the estimated parameters 1122, the target parameters 1124, and the synthetic impulse responses 1126, each of which is described above. The storage manager 1118 can include additional data, such as estimated decay envelopes, a decay rate parameter, a noise floor parameter, digital audio recordings and/or an augmented impulse response dataset.

Each of the components 1106-1126 of the impulse response system 1104 can include software, hardware, or both. For example, the components 1106-1126 can include one or more instructions stored on a computer-readable storage medium and executable by processors of one or more computing devices, such as a client device (e.g., a mobile client device) or server device. When executed by the one or more processors, the computer-executable instructions of the impulse response system 1104 can cause a computing device to perform the feature learning methods described herein. Alternatively, the components 1106-1126 can include hardware, such as a special-purpose processing device to perform a certain function or group of functions. In addition, the components 1106-1126 of the impulse response system 1104 can include a combination of computer-executable instructions and hardware.

Furthermore, the components 1106-1126 of the impulse response system 1104 may be implemented as one or more operating systems, as one or more stand-alone applications, as one or more modules of an application, as one or more plug-ins, as one or more library functions or functions that may be called by other applications, and/or as a cloud-computing model. Thus, the components 1106-1126 may be implemented as a stand-alone application, such as a desktop or mobile application. Additionally, the components 1106-1126 may be implemented as one or more web-based applications hosted on a remote server. The components 1106-1126 may also be implemented in a suite of mobile device applications or "apps." To illustrate, the components 1106-1126 may be implemented in an application, including but not limited to ADOBE AUDITION and ADOBE CREATIVE CLOUD or other digital content applications software packages. The foregoing are either registered trademarks or trademarks of Adobe Inc. in the United States and/or other countries.

Figure 12:
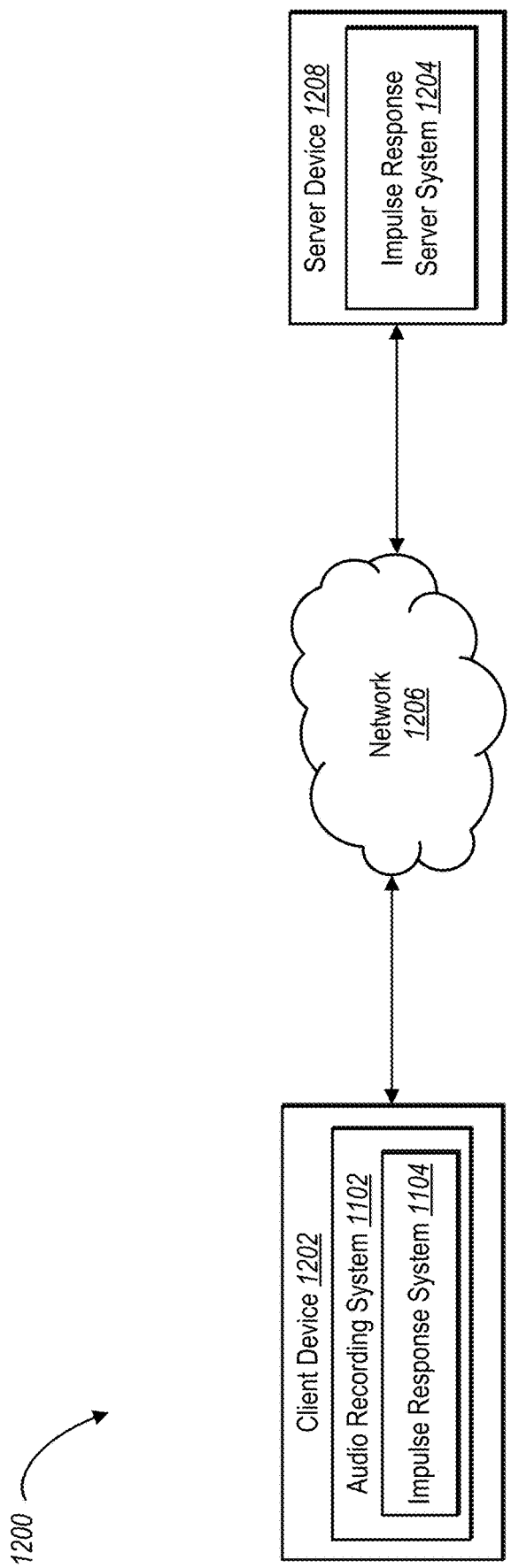
FIG. 12 illustrates a schematic diagram of an environment in which an impulse response system can operate in accordance with one or more embodiments.

FIG. 12 illustrates a schematic diagram of a system 1200 in which the impulse response system 1104 can operate in accordance with one or more embodiments. As shown in FIG. 12, the system 1200 includes a client device 1202 and a server device 1208 connected via a network 1206. Additional detail regarding computing devices (e.g., the client device 1202 and the server device 1208) is provided below in connection with FIG. 14. Further, FIG. 14 also provides detail regarding networks, such as the illustrated network 1206.

Although FIG. 12 illustrates a particular number, type, and arrangement of components within the system 1200, various additional environment configurations are possible. For example, the server device 1208 can represent a set of connected server devices. As another example, the system 1200 can include an additional number of client devices. As a further example, the client device 1202 may communicate directly with the server device 1208, bypassing the network 1206 or utilizing a separate and/or additional network.

As shown, the client device 1202 includes the impulse response system 1104 implemented within the audio recording system 1102, which is described above. In one or more embodiments, the impulse response system 1104 operates on a client device without the audio recording system 1102.

As shown, the system 1200 includes the server device 1208 implementing an acoustic improvement server system 1204. In one or more embodiments, the acoustic improvement server system 1204 communicates with the impulse response system 1104 on the client device 1202 to facilitate the functions, operations, and actions previously described above with respect to the impulse response system 1104. For example, the acoustic improvement server system 1204 can provide digital content (e.g., a web page) to a user on the client device 1202 and generate synthetic impulse responses, repair an acoustic impulse response, and/or modify a digital audio recording, as previously described.

Moreover, in one or more embodiments, the acoustic improvement server system 1204 on the server device 1208 can include all, or a portion of, the impulse response system 1104. For example, in one or more embodiments, the impulse response system described herein can be located on the server device 1208 as part of the acoustic improvement server system 1204 rather than on the client device 1202. In these embodiments, a user on the client device 1202 may access the impulse response system on the server device 1208 via an application on the client device 1202. In some embodiments, the client device 1202 can download all or a portion of a software application corresponding to the impulse response system 1104 such that at least a portion of the operations performed by the impulse response system 1104 occur on the client device 1202.

FIGS. 1-12, the corresponding text, and the examples provide a number of different methods, systems, devices, and non-transitory computer-readable media of the impulse response system. In addition to the foregoing, one or more embodiments can also be described in terms of flowcharts comprising acts for accomplishing a particular result, such as the flowcharts of acts shown in FIG. 13. Additionally, the acts described herein may be repeated or performed in parallel with one another or parallel with different instances of the same or similar acts.

As mentioned previously, FIG. 13 illustrates a flowchart of a series of acts 1300 of generating a synthetic impulse response in accordance with one or more embodiments.

Figure 13:
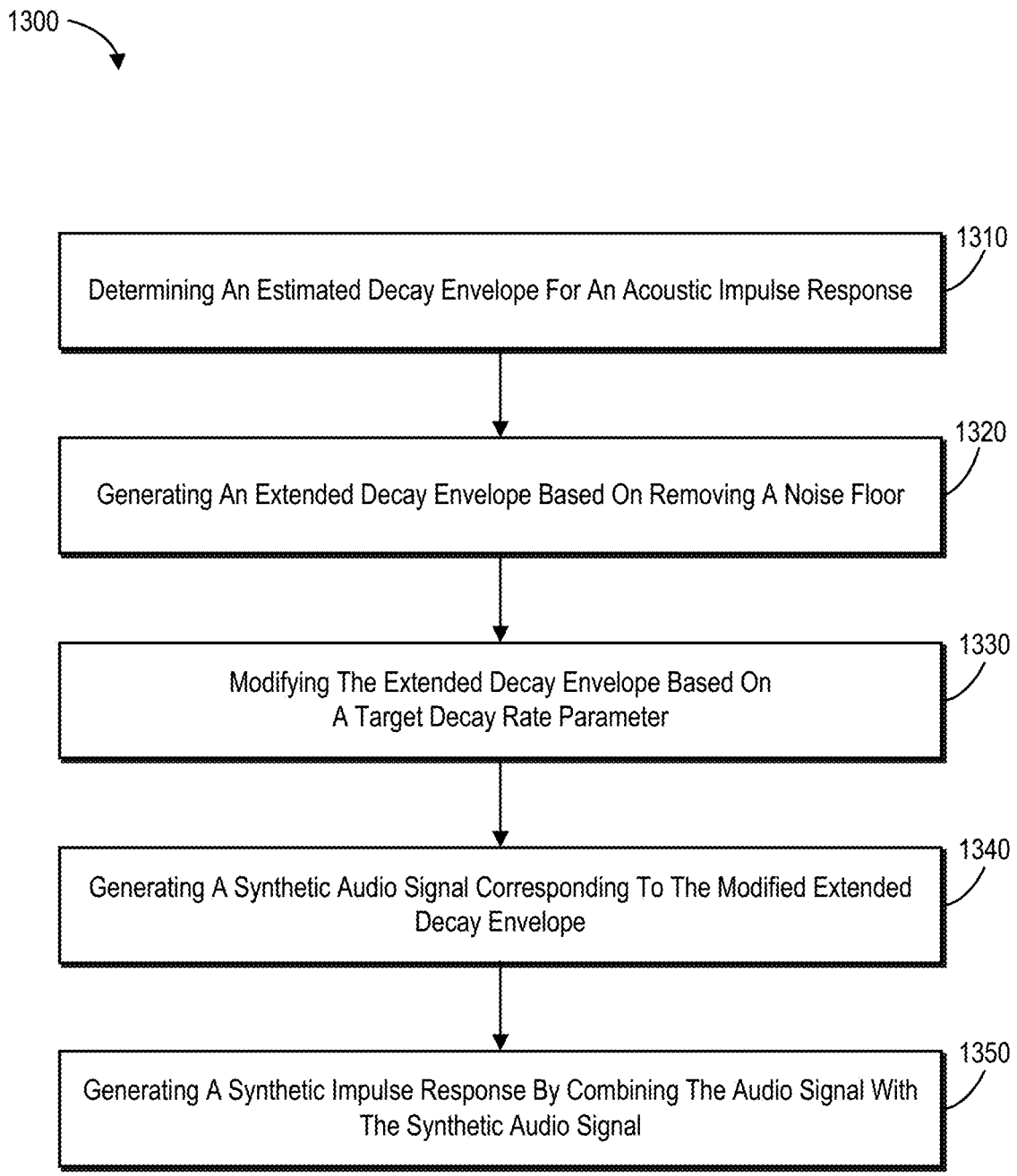
FIG. 13 illustrates a flowchart of a series of acts of generating a synthetic impulse response in accordance with one or more embodiments.

While FIG. 13 illustrates acts according to one embodiment, alternative embodiments may omit, add to, reorder, and/or modify any of the acts shown in FIG. 13. The acts of FIG. 13 can be performed as part of a method. Alternatively, a non-transitory computer-readable medium can comprise instructions that, when executed by one or more processors, cause a computing device to perform the acts of FIG. 13. In some embodiments, a system can perform the acts of FIG. 13.

In one or more embodiments, the series of acts 1300 is implemented on one or more computing devices, such as the client device 1202, the server device 1208, or the computing device 1100. In addition, in some embodiments, the series of acts 1300 is implemented in a digital medium environment for capturing audio data. For example, the series of acts 1300 is implemented on a computing device and one or more memory device that includes an audio signal of an acoustic impulse response, an estimated decay envelope for the acoustic impulse response, a decay rate parameter, and a noise floor parameter corresponding to the audio signal/ acoustic impulse response.

The series of acts 1300 can include an act 1310 of determining an estimated decay envelope for an acoustic impulse response. In particular, the act 1310 can include determining an estimated decay envelope for an acoustic impulse response of an audio signal by identifying a decay rate parameter and a noise floor parameter. In one or more embodiments, the act 1310 can include capturing a digital audio recording (i.e., an acoustic impulse response) from an external microphone connected to the client device or one or more internal microphones integrated into the client device.

As shown, the series of acts 1300 also includes an act 1320 of generating an extended decay envelope based on removing a noise floor. In particular, the act 1320 can involve generating an extended decay envelope based on modifying the noise floor parameter to remove a noise floor associated with the estimated decay envelope. In one or more embodiments, the act 1320 can include generating the extended decay envelope by setting the noise floor parameter to zero to remove the noise floor associated with the estimated decay envelope.

As shown in FIG. 13, the series of acts 1300 further includes an act 1330 of modifying the extended decay envelope by revising the decay rate parameter based on a target decay rate parameter. In particular, the act 1330 can include modifying the extended decay envelope by revising the decay rate parameter based on a target decay rate parameter. In one or more embodiments, the act 1330 can include determining a decay rate ratio based on the target decay rate parameter and the decay rate parameter of the acoustic impulse response as well as applying the decay rate ratio to the extended decay envelope. Indeed, the act 1330 can include modifying the extended decay envelope based on applying the decay rate ratio to the extended decay envelope.

As shown, the series of acts 1300 also includes an act 1340 of generating a synthetic audio signal corresponding to the modified extended decay envelope. In one or more embodiments, the act 1340 can include synthesizing a Gaussian noise signal based on the modified extended decay envelope. In some embodiments, the act 1340 can include determining a noise onset floor time.

As shown in FIG. 13, the series of acts 1300 further includes an act 1350 of generating a synthetic impulse response by combining the audio signal (of the acoustic impulse response) with the synthetic audio signal. In various embodiments, the act 1350 can include cross-fading the audio signal with the synthetic audio signal based on the noise onset time to generate a synthetic impulse response. In one or more embodiments, the act 1350 can include generating a plurality of synthetic impulse responses including the synthetic impulse response and training a machine-learning model based on the plurality of synthetic impulse responses. In some embodiments, the act 1350 can include identifying a corrupt segment or portion of the acoustic impulse response and repairing the corrupt segment or portion of the acoustic impulse response based on the synthetic impulse response. For example, the act 1350 can include modifying the frequency equalization of the acoustic impulse response based on the synthetic impulse response to reconstruct the acoustic impulse response.

The series of acts 1300 can include various additional acts. For example, the series of acts 1300 can include the acts of determining a direct-to-reverberant ratio (DRR) for an additional acoustic impulse response including an additional audio signal, where the DRR includes a ratio of an early-field response to a late-field response as well as generating an additional synthetic impulse response from the additional acoustic impulse response based on a target DRR. In additional embodiments, the series of acts 1300 can include the acts of determining a scalar based on decomposing the early-field response of the additional acoustic impulse response into a windowed direct-path portion and a residual portion of the additional acoustic impulse response and solving for the scalar based on the windowed direct-path portion, the residual portion, the late-field response, and the target DRR. In some embodiments, solving for the scalar includes utilizing a quadratic equation to solve for the scalar.

In additional embodiments, the series of acts 1300 can include the acts of generating the additional synthetic impulse response from the additional acoustic impulse response by utilizing a Hann window to apply the scalar to the early-field response of the additional acoustic impulse response to generate a modified early-field response. In one or more embodiments, the series of acts 1300 can include the act of generating the additional synthetic impulse response from the additional acoustic impulse response by cross-fading the modified early-field response with the late-field response of the acoustic impulse response.

The term "digital environment," as used herein, generally refers to an environment implemented, for example, as a stand-alone application (e.g., a personal computer or mobile application running on a computing device), as an element of an application, as a plug-in for an application, as a library function or functions, as a computing device, and/or as a cloud-computing system. A digital medium environment allows the impulse response system to capture and/or analyze digital audio data and/or digital audio recordings (including acoustic impulse responses), as described herein.

Embodiments of the present disclosure may comprise or utilize a special-purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid-state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general-purpose or special-purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special-purpose computer, or special-purpose processing device to perform a certain function or group of functions. In some embodiments, computer-executable instructions are executed by a general-purpose computer to turn the general-purpose computer into a special-purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 14:
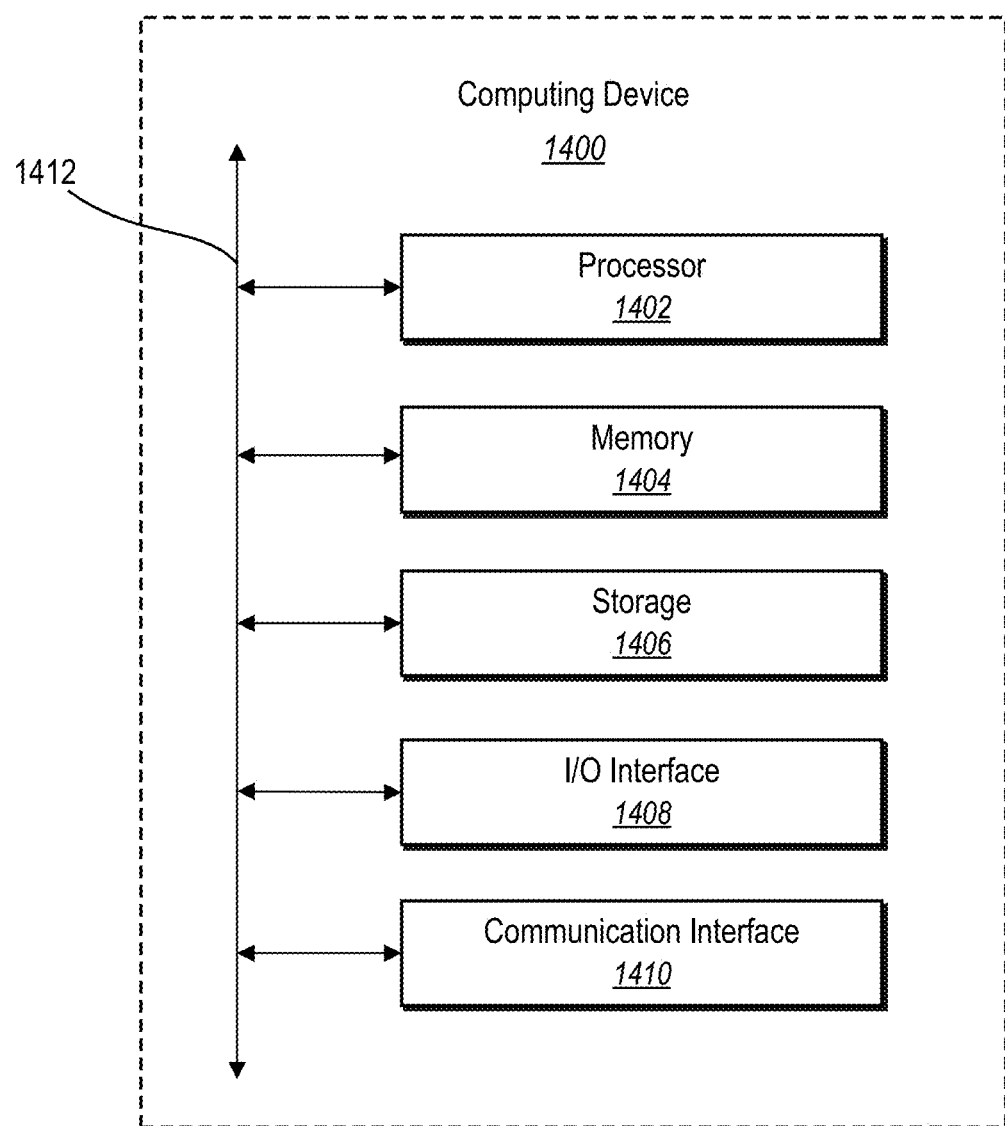
FIG. 14 illustrates a block diagram of an example computing device for implementing one or more embodiments of the present disclosure.

FIG. 14 illustrates a block diagram of an example computing device 1400 that may be configured to perform one or more of the processes described above. One will appreciate that one or more computing devices, such as the client device 1202, the server device 1208, or the computing device 1100. In one or more embodiments, the computing device 1400 may be a mobile device (e.g., a laptop, a tablet, a smartphone, a mobile telephone, a camera, a tracker, a watch, a wearable device, etc.). In some embodiments, the computing device 1400 may be a non-mobile device (e.g., a desktop computer, a server device, a web server, a file server, a social networking system, a program server, an application store, or a content provider). Further, the computing device 1400 may be a server device that includes cloud-based processing and storage capabilities.

As shown in FIG. 14, the computing device 1400 can include one or more processor(s) 1402, memory 1404, a storage device 1406, input/output ("I/O") interfaces 1408, and a communication interface 1410, which may be communicatively coupled by way of a communication infrastructure (e.g., bus 1412). While the computing device 1400 is shown in FIG. 14, the components illustrated in FIG. 14 are not intended to be limiting. Additional or alternative components may be used in other embodiments. Furthermore, in certain embodiments, the computing device 1400 includes fewer components than those shown in FIG. 14. Components of the computing device 1400 shown in FIG. 14 will now be described in additional detail.

In particular embodiments, the processor(s) 1402 includes hardware for executing instructions, such as those making up a computer program. As an example, and not by way of limitation, to execute instructions, the processor(s) 1402 may retrieve (or fetch) the instructions from an internal register, an internal cache, memory 1404, or a storage device 1406 and decode and execute them.

The computing device 1400 includes memory 1404, which is coupled to the processor(s) 1402. The memory 1404 may be used for storing data, metadata, and programs for execution by the processor(s). The memory 1404 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1404 may be internal or distributed memory.

The computing device 1400 includes a storage device 1406 includes storage for storing data or instructions. As an example, and not by way of limitation, the storage device 1406 can include a non-transitory storage medium described above. The storage device 1406 may include a hard disk drive (HDD), flash memory, a Universal Serial Bus (USB) drive or a combination these or other storage devices.

As shown, the computing device 1400 includes one or more I/O interfaces 1408, which are provided to allow a user to provide input to (e.g., user strokes), receive output from, and otherwise transfer data to and from the computing device 1400. These I/O interfaces 1408 may include a mouse, keypad or a keyboard, a touch screen, camera, optical scanner, network interface, modem, other known I/O devices or a combination of these I/O interfaces 1408. The touch screen may be activated with a stylus or a finger.

The I/O interfaces 1408 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1408 are configured to provide graphical data to a display for presentation to a user. The graphical data may be representative of one or more graphical user interfaces and/or any other graphical content as may serve a particular implementation.

The computing device 1400 can further include a communication interface 1410. The communication interface 1410 can include hardware, software, or both. The communication interface 1410 provides one or more interfaces for communication (such as, for example, packet-based communication) between the computing device and one or more other computing devices or one or more networks. As an example, and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI. The computing device 1400 can further include a bus 1412. The bus 1412 can include hardware, software, or both that connects components of computing device 1400 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause a computing device to:
   determine an estimated decay envelope for an acoustic impulse response comprising an audio signal by identifying a decay rate parameter and a noise floor parameter;
   generate an extended decay envelope based on modifying the noise floor parameter to remove a noise floor associated with the estimated decay envelope;
   modify the extended decay envelope by revising the decay rate parameter based on a target decay rate parameter;
   generate a synthetic audio signal corresponding to the modified extended decay envelope; and
   generate a synthetic impulse response by combining the audio signal with the synthetic audio signal.

2. The non-transitory computer-readable medium of claim 1, further comprising additional instructions that, when executed by the at least one processor, cause the computing device to:
   determine a direct-to-reverberant ratio (DRR) for one or more frequency sub-bands of an additional acoustic impulse response comprising an additional audio signal, wherein the DRR comprises a ratio of an early-field response to a late-field response; and
   generate an additional synthetic impulse response from the additional acoustic impulse response based on a target DRR.

3. The non-transitory computer-readable medium of claim 2, further comprising additional instructions that, when executed by the at least one processor, cause the computing device to determine a scalar based on:
   decomposing the early-field response of the additional acoustic impulse response into a windowed direct-path portion and a residual portion of the additional acoustic impulse response; and
   solving for the scalar based on the windowed direct-path portion, the residual portion, the late-field response, and the target DRR.

4. The non-transitory computer-readable medium of claim 3, wherein the additional instructions that, when executed by the at least one processor, cause the computing device to generate the additional synthetic impulse response from the additional acoustic impulse response by applying the scalar to the early-field response of the additional acoustic impulse response to generate a modified early-field response.

5. The non-transitory computer-readable medium of claim 1, wherein the instructions, that when executed by the at least one processor, cause the computing device to generate the extended decay envelope by setting the noise floor parameter to zero to remove the noise floor associated with the estimated decay envelope.

6. The non-transitory computer-readable medium of claim 5, wherein the instructions that, when executed by the at least one processor, cause the computing device to modify the extended decay envelope by:
determining a decay rate ratio based on the target decay rate parameter and the decay rate parameter of the acoustic impulse response; and
applying the decay rate ratio to the extended decay envelope.

7. The non-transitory computer-readable medium of claim 6, wherein the instructions that, when executed by the at least one processor, cause the computing device to generate the synthetic audio signal corresponding to the modified extended decay envelope by synthesizing a Gaussian noise signal based on the modified extended decay envelope.

8. The non-transitory computer-readable medium of claim 7, further comprising additional instructions that, when executed by the at least one processor, cause the computing device to determine a noise onset floor time; and
wherein the instructions that, when executed by the at least one processor, cause the computing device to generate the synthetic impulse response by cross-fading the audio signal and the synthetic audio signal at the noise floor onset time.

9. The non-transitory computer-readable medium of claim 1, further comprising additional instructions that, when executed by the at least one processor, cause the computing device to:
generate a plurality of synthetic impulse responses comprising the synthetic impulse response; and
train a machine-learning model based on the plurality of synthetic impulse responses.

10. The non-transitory computer-readable medium of claim 1, further comprising additional instructions that, when executed by the at least one processor, cause the computing device to:
identify a corrupt portion of the acoustic impulse response; and
repair one or more frequency sub-bands of the corrupt portion of the acoustic impulse response by modifying a frequency equalization of the acoustic impulse response based on the synthetic impulse response.

11. A system comprising:
one or more memory devices comprising:
an acoustic impulse response corresponding to an audio signal, an estimated decay envelope for the acoustic impulse response, a decay rate parameter, and a noise floor parameter corresponding to the audio signal; and
one or more server devices that cause the system to, for one or more frequency sub-bands:
generate an extended decay envelope for the acoustic impulse response based on setting the noise floor parameter to zero;
determine a decay rate ratio based on the decay rate parameter and a target decay rate parameter;
modify the extended decay envelope based on applying the decay rate ratio to the extended decay envelope;
generate a synthetic audio signal corresponding to the modified extended decay envelope; and
cross-fade the audio signal with the synthetic audio signal based on a noise onset time to generate a synthetic impulse response.

12. The system of claim 11, wherein the one or more server devices further cause the system to:
determine a direct-to-reverberant ratio (DRR) for an additional acoustic impulse response comprising an additional audio signal, wherein the DRR comprises a ratio of an early-field response to a late-field response; and
generate an additional synthetic impulse response from the additional acoustic impulse response based on a target DRR.

13. The system of claim 12, wherein the one or more server devices cause the system to determine a scalar based on:
decomposing the early-field response of the additional acoustic impulse response into a windowed direct-path portion and a residual portion of the additional acoustic impulse response; and
solving for the scalar based on the windowed direct-path portion, the residual portion, the late-field response, and the target DRR.

14. The system of claim 13, wherein the one or more server devices cause the system to generate the additional synthetic impulse response from the additional acoustic impulse response by utilizing window function to apply the scalar to the early-field response of the additional acoustic impulse response to generate a modified early-field response.

15. The system of claim 14, wherein the one or more server devices cause the system to generate the additional synthetic impulse response from the additional acoustic impulse response by cross-fading the modified early-field response with the late-field response of the acoustic impulse response.

16. The system of claim 11, wherein the one or more server devices cause the system to generate the synthetic audio signal corresponding to the modified extended decay envelope by synthesizing a Gaussian noise signal based on the modified extended decay envelope.

17. The system of claim 16, wherein:
the one or more server devices further cause the system to determine a noise onset floor time; and
the one or more server devices further cause the system to generate the synthetic impulse response by cross-fading the audio signal with the synthetic audio signal at the noise floor onset time to generate the synthetic impulse response.

18. In a digital medium environment for measuring acoustic impulse responses, a computer-implemented method of improving audio recordings, comprising:
identifying an acoustic impulse response, wherein the acoustic impulse response reflects an initial decay rate parameter and an initial direct-to-reverberant ratio;
performing a step for modifying the acoustic impulse response based on a modified decay rate parameter;
performing a step for modifying the acoustic impulse response based on a modified direct-to-reverberant ratio; and
utilizing the modified acoustic impulse response to perform at least one of: training a machine-learning model, modifying an audio signal corresponding to the acoustic impulse response, or repairing the acoustic impulse response.

19. The method of claim 18, further comprising:
generating a plurality of modified impulse responses comprising the modified acoustic impulse response; and
training the machine-learning model based on the plurality of modified impulse responses.

20. The method of claim 18, further comprising:
identifying a corrupt portion of the acoustic impulse response; and
repairing the corrupt portion of the acoustic impulse response based on the modified acoustic impulse response.

* * * * *